US007929560B2

(12) United States Patent
Morioka

(10) Patent No.: US 7,929,560 B2
(45) Date of Patent: Apr. 19, 2011

(54) PACKET TRANSMITTING APPARATUS

(75) Inventor: Yoshihiro Morioka, Nara (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 11/995,748

(22) PCT Filed: Jul. 11, 2006

(86) PCT No.: PCT/JP2006/313722
§ 371 (c)(1),
(2), (4) Date: Jan. 15, 2008

(87) PCT Pub. No.: WO2007/010779
PCT Pub. Date: Jan. 25, 2007

(65) Prior Publication Data
US 2009/0288125 A1    Nov. 19, 2009

(30) Foreign Application Priority Data

Jul. 15, 2005    (JP) ................................. 2005-206423

(51) Int. Cl.
*H04L 12/28* (2006.01)
(52) U.S. Cl. .......... 370/419; 370/351; 370/389; 725/37; 725/39; 725/48; 725/49; 725/56; 725/143; 725/148
(58) Field of Classification Search .................. 370/419, 370/351, 389; 725/37, 39, 48, 49, 56, 143, 725/148
See application file for complete search history.

(56) References Cited

U.S. PATENT DOCUMENTS
7,061,544 B1 *   6/2006   Nonomura et al. ........... 348/568
(Continued)

FOREIGN PATENT DOCUMENTS
JP            11-261908        9/1999
(Continued)

OTHER PUBLICATIONS

International Search Report issued Aug. 15, 2006 in the International (PCT) Application of which the present application is the U.S. National Stage.

*Primary Examiner* — Pankaj Kumar
*Assistant Examiner* — Gautam Sharma
(74) *Attorney, Agent, or Firm* — Wenderoth, Lind & Ponack, L.L.P.

(57) ABSTRACT

A packet transmitting apparatus for transmitting a content protected with a content protection technique such as DTCP in the form of packets which are widely used, such as IP packets, and for providing diverse EPG information is provided. Metadata of an A/V stream is utilized to control the output mode, encryption mode, and/or addition of an encryption information header of contents such as video, audio, and data contained in the stream (407). This secures interconnection compatibility between a packet transmitting apparatus and a packet receiving apparatus while maintaining secrecy (414). When a content received through digital television broadcasting is used as an A/V stream, a channel is selected from a full transport stream which is received through broadcasting (409) so as to extract and form a partial transport stream for use (410). EPG information can be selected not only from SI information contained in a digital broadcasting signal but from a plurality of information sources, such as EPG-dedicated channels and the Internet (412).

18 Claims, 22 Drawing Sheets

U.S. PATENT DOCUMENTS

| | | | |
|---|---|---|---|
| 7,372,873 B1 * | 5/2008 | Kumar et al. | 370/484 |
| 2002/0087999 A1 * | 7/2002 | Kashima | 725/100 |
| 2002/0166123 A1 * | 11/2002 | Schrader et al. | 725/58 |
| 2003/0023987 A1 | 1/2003 | Hiramoto et al. | |
| 2004/0131255 A1 * | 7/2004 | Ben-Yaacov et al. | 382/190 |
| 2005/0232497 A1 * | 10/2005 | Yogeshwar et al. | 382/232 |
| 2005/0237937 A1 * | 10/2005 | Van Gestel | 370/235 |
| 2006/0115241 A1 * | 6/2006 | Saigo et al. | 386/124 |
| 2007/0036517 A1 * | 2/2007 | Ikeda et al. | 386/95 |
| 2007/0162981 A1 | 7/2007 | Morioka et al. | |
| 2008/0317115 A1 * | 12/2008 | Kitahara et al. | 375/240.01 |

FOREIGN PATENT DOCUMENTS

| | | |
|---|---|---|
| JP | 2000-059463 | 2/2000 |
| JP | 2001-25834 | 10/2001 |
| JP | 2003-078851 | 3/2003 |
| JP | 2004-118152 | 4/2004 |
| JP | 2004-328463 | 11/2004 |
| JP | 2005-012527 | 1/2005 |
| WO | 2004/010670 | 1/2004 |
| WO | 2005/057865 | 6/2005 |

* cited by examiner

FIG. 20

| | Metadata types | | Recomposition of metadata |
|---|---|---|---|
| General items | Device information (e.g., manufacturer, device model, article number, production number) | | |
| Broadcasting reception | SI information (broadcasting station information, program information) | | Map SI information to SEI |
| | EPG information (acquired from SI in broadcasting station wave) | | When pieces of information on the same program can be acquired from a number of EPG information sources, necessary pieces of information are selected for use. |
| | EPG information (provided by EPG services) | | |
| | EPG information (acquired from the Internet) | | |
| Recording with a movie | Information on shooting person (e.g., ID and name) | | |
| | Date/time | | |
| | Location (position information detected with GPS, GMS, or a wireless LAN) | | |
| | Altitude, air temperature, temperature, wind speed, weather | | |
| | Genre: (examples) note, family, anniversary, athletic meet, game watching, hobby | | |
| | Smell | | |
| | Tags added to scenes, chapters, persons, shape or movement of objects | | |

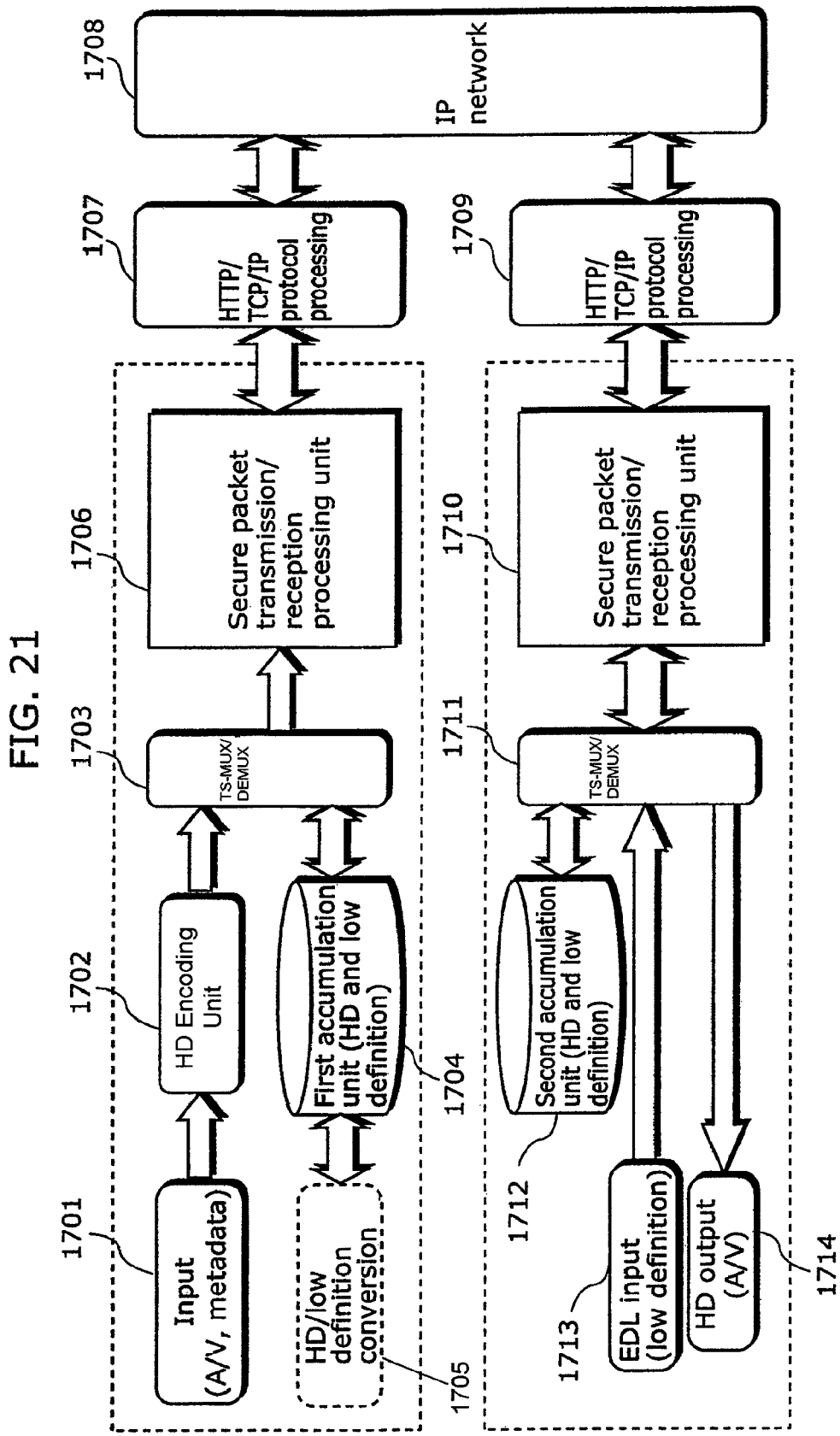

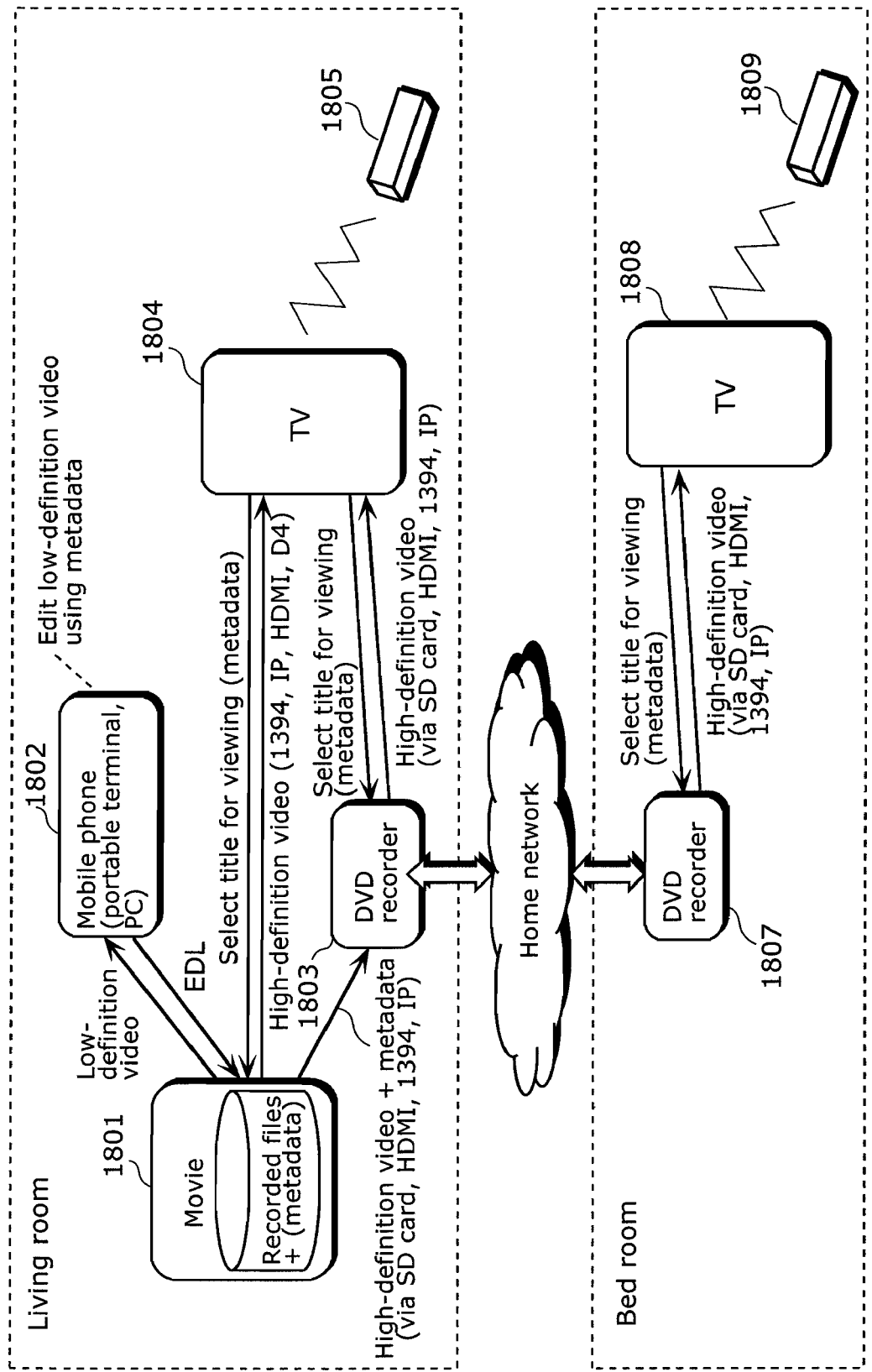

PACKET TRANSMITTING APPARATUS

BACKGROUND OF THE INVENTION

1. Field of Invention

The present invention relates to a packet transmitting apparatus which transmits an A/V stream compressed according to MPEG-2 or H.264 as IP packets after encryption with high quality by using a wired LAN, e.g., Ethernet (™) such as IEEE 802.3, or a wireless LAN such as IEEE 802.11.

2. Description of the Related Art

With the start of digital TV broadcasting, television of high-vision quality (HD quality) can be now easily viewed at home and the proliferation of television receivers is being accelerated.

Meanwhile, as communication or networking techniques develop, various techniques for efficiently transmitting packets have been proposed in recent years (see Patent Reference 1, for instance). As one of such techniques, conventionally, a digital broadcasting tuner and a DVHS-based video recorder may be interconnected by a digital interface based on the IEEE 1394 in a room of an ordinary household, and Moving Picture Experts Group/Transport Stream (MPEG-TS) signals, which is defined in IEC 61883-4, may be transmitted between them. In such a case, when content protection is applied to a broadcast content in a copy control mode such as Copy One Generation (abbreviated as COG), the content needs to be encrypted for secure transmission in order to protect the content from unauthorized copying.

As an example of a method for transmitting encrypted A/V data, such as an MPEG-TS, which is obtained by receiving digital broadcasts and selecting a channel in such a manner, the Digital Transmission Content Protection (DTCP) method has been defined. DTCP is a technique for protecting content on transmission media such as IEEE1394 and USB. The DTCP method is a method standardized by Digital Transmission Licensing Administrator (DTLA), and is described at "www.dtcp.com," "www.dtcp.com/data/dtcp#tut.pdf," "www.dtcp.com/data/wp#spec.pdf," or in a book titled "IEEE 1394; A/V Kiki-eno-ouyou" ("IEEE 1394: Application to A/V devices"), "Chapter 8: Copy Protection", supervised by Shinji Takada, Nikkankogyo Shinbun, pp. 133 to 149.

Here, the MPEG transport stream (abbreviated as MPEG-TS) will be described. An MPEG-TS is a collection of a number of MPEG transport packets (abbreviated as TS packets). A TS packet is a fixed-length packet of 188 bytes, and the length has been determined in consideration of the consistency with the cell length of ATM (out of 53 bytes, 47 bytes is the ATM payload) as well as the applicability when error-correction encoding, such as Read-Solomon code, is performed.

The TS packet is made up of a fixed-length packet header of 4 bytes, an adaptation field of a variable length, and a payload. In the packet header, a PID (packet identifier) and/or various flags are defined. This PID identifies the type of the TS packet. Either one or both of the adaptation_field and the payload may be present, and their presence/absence can be identified with a flag (adaptation_field_control) in the packet header. The adaptation_field has the functions of transmitting information such as PCR (Program_Clock_Reference) and stuffing within a TS packet for making the length of the TS packet a fixed length of 188 bytes. In the case of MPEG-2, the PCR is a timestamp of 27 MHz, and the value of the PCR is referenced in order to reproduce the reference time at the time of encoding in a System Time Clock (STC) of a decoder. The clock for timestamps added to individual TS packets is equivalent to the system clock frequency of MPEG, for example. The packet transmitting apparatus further includes clock regeneration means that receives TS packets and removes transmission jitter that has been added to Program Clock Reference (PCR) through network transmission of an MPEG-TS from the timestamps added to the received TS packets so as to regenerate the MPEG system clock.

For a TS of MPEG-2, the STC of a decoder has PLL synchronization function based on PCR. To stabilize the PLL synchronization operation, the interval of PCR transmission is defined to be within 100 milliseconds by the MPEG standard. An MPEG-PES packet containing individual streams such as video and audio is transmitted being divided into payloads of a plurality of TS packets having the same PID number. Here, the beginning of a PES packet is configured to start at the beginning of a TS packet.

Since a transport stream can transmit a number of programs together, table information is used that represents the relationship between the programs contained in the stream and program elements that make up the programs, such as video and audio streams. This table information is called Program Specific Information (PSI), and uses such a table as a Program Association Table (PAT) and a Program Map Table (PMT). The PSI in a PAT or PMT is transmitted being placed in the payload of TS packets in units called section.

In a PAT, the PID of an PMT corresponding to a program number and the like is designated, and in the PMT, PIDs of video, audio, and additional data contained in the corresponding program as well as the PID of PCR are described, so that TS packets that constitute a target program can be retrieved from a stream by referencing the PAT and the PMT. Reference documents on TS include CQ Publishing CO., Ltd., TECH I Vo.4, "Gazou & Onsei asshuku gijutsu no subete (Internet/dejitaru TV, mobairu tsuushin jidaino hissu gijutsu)" ("All about image & audio compression techniques (essential techniques for the Internet/digital TV and mobile communication era))", supervised by Hiroshi Fujiwara, Chapter 6 "Gazou ya onseiwo tajuukasuru MPEG shisutemu (MPEG system for image/audio multiplexing)", for example, which provides commentary on TS.

Logical hierarchy structures, exemplary processing procedures, and exemplary channel selection processing relating to PSI and/or SI are described in Miyake et al., "Dejitaru housou jushinki ni okeru senkyoku gijutsu (Channel selection techniques for digital broadcasting receivers), Sanyo Electric Gihou (technical journal) Vol. 36, June 2004, 74th issue, pp. 31 to 44.

In relation to an access control method for use in digital broadcasting, specifications of scrambling and relevant information as well as associated specifications of receivers are defined in the ARIB standard, ARIB STD-B25, and the operation thereof is defined in ARIB technical materials, ARIB TR-B14 and ARIB TR-B15.

FIG. 1(a) schematically illustrates an example of transmission of an MPEG-TS by IEEE 1394 using the DTCP method. In the DTCP method, the sending side (a packet transmitting device) is called a source 1901 and the receiving side (a packet receiving device) is called a sink 1902, where an encrypted content such as an MPEG-TS is transmitted from the source 1901 to the sink 1902 via a network 1903. FIG. 1(b) provides examples of source and sink devices as additional information.

FIG. 2 is a diagram generally illustrating a conventional packet communication unit in the DTCP method, where both a packet transmitting unit of the source 1901 and a packet receiving unit of the sink 1902 shown in FIG. 1 are illustrated as a packet transmitting/receiving unit. First, authentication and key exchange (abbreviated as AKE) compliant with the DTCP method are performed. Setting information for the authentication and key exchange is inputted to an AKE unit 2001, from which the information is delivered to a packetization unit 2002. In the packetization unit 2002, the information is packetized with a predetermined header added thereto, and is outputted to a network 2007. Here, the packetization unit 2002 performs packetization and transmission of inputted data in accordance with transmission parameters determined by a transmission condition setting unit 2003. On the receiving side, a signal inputted from the network 2007 is filtered by a packet receiving unit 2004 by identifying packet headers and the like, and inputted to the AKE unit 2001. This enables the AKE unit of the sending side (i.e., the source) and the AKE unit of the receiving side (i.e., the sink) to communicate messages with each other via the network 2007. Specifically, they perform authentication and key exchange in accordance with the procedure of the DTCP method.

Once authentication and key exchange succeed between the sending side (the source) and the receiving side (the sink), A/V data transmission is then performed. In the source, after an MPEG-TS signal is inputted to an encryption unit 2005 to become encrypted, the encrypted MPEG-TS signal is inputted to the packetization unit 2002, from which the signal is outputted to the network 2007. In the sink, the signal inputted from the network 2007 is filtered by the packet receiving unit 2004 by identifying packet headers and the like, and is inputted to and decoded by a decoding unit 2006, which outputs the MPEG-TS signal.

Next, using FIG. 3, the above-mentioned procedure will be additionally described. It is assumed in FIG. 3 that the source and the sink are connected by IEEE1394. First, a request for content transmission occurs on the source side. Then, an encrypted content and protection mode information for the content are transmitted from the source to the sink. The sink analyzes the copy protection information of the content, determines which of a full authentication method or a limited authentication method to use, and sends an authentication request to the source. The source and the sink seek sharing of an authentication key through predetermined processing of DTCP. Then, the source encrypts an exchanged key using the authentication key and sends the exchanged key to the sink, and the sink decodes the exchanged key. To make an encryption key change over time, the source generates seed information that temporally changes, and transmits the information to the sink. The source generates an encryption key from the exchanged key and the seed information, and encrypts an MPEG-TS in the encryption unit using the encryption key, and transmits the MPEG-TS to the sink. The sink receives the seed information and reconstructs a decoding key from the exchanged key and the seed information. The sink uses the decoding key to decode the encrypted MPEG-TS signal.

FIG. 4 shows an example of an IEEE1394 isochronous packet for a case where an MPEG-TS signal is transmitted in FIG. 1. This packet is composed of a 4-byte (32-bit) header, a 4-byte (32-bit) header CRC, a 224-byte data field, and a 4-byte (32-nit) trailer. Out of a CIP header and a TS signal that constitute the 224-byte data field, only the TS signal is encrypted during transmission, other data not being encrypted. Here, information specific to the DTCP method is a 2-bit Encryption Mode Indicator (EMI) which is copy protection information, and O/E (Odd/Even) which is the LSB bit of seed information, and they are transmitted being unencrypted because they are present in the 32-bit header.

In the above-described manner, A/V data of a broadcast program which has been obtained by receiving digital broadcasting and selecting a channel is transmitted to the receiving side under the protection of encryption. During this transmission, it is easy to transmit metadata contained in the same TS signal as the A/V data to the receiving side together with the A/V data.

For example, information on an electronic program guide (EPG) may be broadcast being multiplexed on the same TS signal as A/V data of a broadcast program. EPG information is a typical example of metadata relevant to a broadcast program. By referencing the EPG information, users can enjoy convenience when selecting a program or setting programmed recording.

Patent Reference 1: Japanese Unexamined Patent Application Publication No. 2000-59463

BRIEF SUMMARY OF THE INVENTION

However, no technique is yet known that is effective for presenting desirable metadata to a user in a situation where, in addition to metadata multiplexed on a content, different metadata on the content is provided also by other information sources.

Taking a broadcast program as a specific example, a variety of metadata relevant to the broadcast program is now provided by many information sources, including EPG information distribution channels which are different from the channel on which the program is broadcast, or television guide sites and television blog sites on the Internet.

For example, television guide sites on the Internet can provide more detailed description on programs than program descriptions which are contained in EPG information multiplexed on broadcast programs, or television blog sites provide metadata that goes beyond the substance of EPG information, such as feedback on broadcast programs or introduction of must-see scenes for those who watch recorded programs.

In view of such a situation, an object of the present invention is to provide a packet transmitting apparatus that transmits a content protected with a content protection technique, such as DTCP, as IP packets utilizing the HTTP or RTP protocol and that has the increased capability of providing more diverse metadata than conventional counterparts.

In order to achieve the aforementioned object the packet transmitting apparatus according to the present invention is a packet transmitting apparatus, including: a reception unit which receives an input stream including first program information relating to a program; a metadata information acquisition unit which acquires second program information relating to the program, from at least one of a broadcasting channel and a communication network; a program information recomposition unit which recomposes new program information relating to the program by selecting one of the first program information and the second program information, or combining both the first and the second program information; a filtering unit which performs filtering on the input stream using the recomposed new program information; and a transmission unit which forms a new output stream that contains the filtered input stream, packetizes the formed output stream, and transmits the packetized output stream to the outside.

Furthermore, in the packet transmitting apparatus, the reception unit receives the input stream from a broadcast signal, and the packet transmitting apparatus further includes: an input unit which accepts another input stream from an external input signal different from the broadcast signal; a switcher which selects one of the input stream received by the reception unit and the input stream accepted by the input unit; a signal format/property detection unit which detects, from the selected input stream, data format information which indicates a data format of content data contained in the input stream or attribute information which indicates an attribute of the content data; an encapsulation unit which encapsulates the detected data format information or the detected attribute information into transport packets; a descriptor insertion unit which generates a descriptor relating to the content data contained in the selected input stream, and to insert the descriptor into the input stream; a partial transport stream generation unit which generates a partial transport stream by multiplexing the encapsulated transport packets with transport packets of the input stream inserted with the descriptor while giving a greater delay to the encapsulated transport packets than the transport packets of the input stream inserted with the descriptor, and adding a timestamp to each of the transport packets, a data block forming unit which converts the transport packets of the generated partial transport stream into transmission packet payloads of a predetermined size; a transmission packet header generation unit which, when the detected data format information or the detected attribute information is control information relating to transmission, duplication, or reproduction of the content data, generates a transmission packet header which contains size information indicating the predetermined size and also contains the control information; and a transmission packet generation unit which generates transmission packets by combining the converted transmission packet payloads and the generated transmission packet header.

More specifically, a first aspect of the present invention uses inputted A/V data and its metadata to control the addition of a data block header and encryption in accordance with predetermined transmission and reception conditions so as to perform packetization. An encryption mode is executed using copy control information (CCI) of an A/V stream such as an MPEG-TS signal, enabling packet transmission to be performed while securing signal compatibility between a packet transmitting device and a packet receiving devices.

EPG information for broadcasting includes information extracted from SI information which is contained in a digital broadcasting signal, information extracted from EPG-dedicated channels, and information acquired from EGP information on the Internet, for example. Such information can be made up of the type of a broadcasting system, identification of a broadcasting network, information on broadcasting schedule/channels, program title, program genre, channel number, start time of a program, ending time of a program, program description (a simple description version and a detailed description version), and so on.

The present invention is significantly different from conventional inventions in that the present invention can also select desired information from the plurality of information sources or select and combine separate pieces of information to recompose EPG information. The present invention can also maintain and preserve the attribute of the information sources during such combination and recomposition of information.

A second aspect of the present invention makes data in the beginning or end of a transmission data block which is made up of a plurality of encryption-controlled A/V data correspond with data in the beginning of a data block which is managed on the sending side, when the receiving side requests the sending side to transmit data by the HTTP protocol. As an example, when the data is MPEG, the units of data blocks managed on the sending side can be units of GOPs, Pictures, macro-blocks, blocks, TS packets, or time-stamped TS packets.

When the data blocks are in a hard disk drive (abbreviated as an HDD) contained in the transmitting apparatus, or an optical disk such as a CD and a DVD (having a number of types such as DVD-R and DVD-RAM), the units of the data blocks can be units of the logical blocks of the recoding format of the HDD, CD, or DVD.

For example, when data (e.g., a file or a stream) is MPEG, even if the range of data which is requested by the receiving side from the sending side with an HTTP range request does not align with a data boundary of GOP units or Picture units (which is also technically expressed as "data alignment is not achieved"), a GOP unit or a Picture unit which is positioned near the data range requested as an HTTP response can be returned as a response by way of processing on the sending side. Thus, the receiving side can efficiently perform MPEG decoding from received data.

A third aspect of the present application includes an MPEG-2/H.264 transcoder, in addition to the configuration of the packet transmission unit, for transcoding a file of an MPEG-2 TS accumulated in the accumulation unit into H.264. As this transcoding can reduce the file size to about half or smaller while maintaining image quality, more files can be accumulated and also an H.264 stream can be transmitted in real time in a narrower band or file transfer at a higher speed is possible.

For example, when an in-home network is build with a wireless LAN, with MPEG-2, the TS bit rate of HDTV is about 25 Mbps and band is insufficient in the wireless LAN, whereas with H.264, the transmission rate can be reduced to about 8 Mbps and thus HDTV can be wirelessly transmitted in a house with allowance. In the case of SDTV, since the transmission rate can be reduced to about 1.5 Mbps, the transmission rate will be only about 9 Mbps for six channels, for example, which means MPEG-TSs for six major broadcast stations can be transmitted concurrently between a home server and a client.

A fourth aspect of the present application is similar to the configuration described above but is significantly different in that it has two input channels and two output channels. That is, signals on the input channels form a stereoscopic image. To transmit a stereoscopic image, a left-eye image and a right-eye image are inputted to the two inputs. Here, the left-eye image and right-eye image to be inputted are subjected to video frame synchronization or video field synchronization between the left image and the right image at the time of H.264 encoding. Also, in H.264, by synchronizing a 2-channel image made up of a left-eye image and a right-eye image based on IDR pictures, signal processing such as video synchronization processing is facilitated and the cost of the apparatus can be also reduced. Furthermore, when encoding a 3D (stereoscopic) image using MPEG-2 or H.264, since the left-eye image and the right-eye image typically resemble each other, the bit rate of the left-eye image can be made small by encoding the left-eye image with reference to the right-eye image. Consequently, in this case, the total bit rate can be limited to a bit rate about 1.5 times the bit rate of the right-eye image.

A fifth aspect of the present application has the external input connected to an H.264 encoder in the configuration of the second aspect. In H.264 processing, general metadata and digital broadcasting are received, and metadata acquired from Service Information (SI) for the broadcasting, metadata such as EPG information provided by EPG providers, metadata such as EPG acquired from the Internet, or metadata associated with an A/V content (e.g., a clip) which is taken by a person with a movie are inputted to Supplemental Enhancement Information (SEI). Metadata can be stored in User Data Unregistered SEI of SEI, for instance. By making use of such metadata, it is possible to efficiently utilize contents, such as to search for a desired content from among many A/V contents, to classify contents into libraries, or to automatically display content.

In addition, when a music program is received through digital broadcasting, it is not necessary to find the start of a certain tune when the music program is transmitted live to another room. However, when the music program is received on digital broadcasting and once accumulated in the accumulation unit for subsequent viewing, there can be a user's demand to easily access a desired tune from among a plurality of tunes which were broadcast in the program. However, when the music program is received through digital broadcasting, though the title of the program and the title of some tunes can be acquired from EPG information (e.g., an EIT or Event Information Table) in SI, information on the airtime of each tune and the like is not available. Consequently, there is a problem of the user being unable to easily access a desired tune when reproducing a tune from the accumulation unit.

Accordingly, as the means of solution, the present invention accesses a tune information server on the Internet to acquire tune information for the music program. Then, a tune position table is created that associates the acquired tune information for the music program with a plurality of tunes in the music program which are recorded in the accumulation unit by way of time range information and the like of the music program, and the table is recorded in a directory for storing tune position tables in the accumulation unit. When the user performs browsing or search through a service for UPnP-A/V, the user is allowed to instantly access a desired tune with an HTTP time range designation and the like by use of the tune position table for each tune in the music program and for the file of the title of the music program (or <res> defined in UPnP). Also, in relation to tune access by HTTP, by "setting up an application for designating the airtime of a tune in the broadcast program from the title of the tune by specifying the tune title with a Common Gateway Interface (CGI) parameter", for example, it is also possible to realize a convenient tune access function. Also, when information on the tunes in the music program cannot be acquired from the Internet, tune information for the music program can be acquired by inquiring waveform data for a tune, e.g., the high point of the tune, from a server for a tune title analysis service on the Internet and the like.

A sixth aspect of the present application realizes efficient editing when an HD content in the MPEG-TS format which is taken with an HD movie and its metadata are accumulated in a home server. An HD/low definition conversion unit converts an HD content accumulated in the accumulation unit 1 into a content of a low definition and a low bit rate. When a content accumulated in the home server is to be remotely edited via a network from a PC in another room or a portable terminal, to send the HD content to the PC or the portable terminal, an accumulated low-definition content is transmitted to the receiving side in order to lessen the processing load on devices and network load. Also, as processing on the receiving side, an editing list (EDL) is created and the EDL is transmitted to the sending side. The sending side transmits an HD content edited based on the received EDL to the receiving side. By deleting unnecessary images in this way, the amount of data to be transmitted to the receiving side can be reduced.

Note that the present invention can be realized not only as such a packet transmitting apparatus but also as a packet transmitting method, a program for the packet transmitting apparatus, or a computer-readable recording medium, such as a CD-ROM and a DVD-RAM, on which the program is recorded.

According to the first aspect of the present invention, packet transmission can be performed using inputted A/V data and its metadata while securing signal compatibility between the packet transmitting and receiving devices.

As EPG information for broadcasting, more diverse and detailed metadata than conventionally available can be obtained by selecting desired information from SI information in a digital broadcasting signal, information extracted from an EPG-dedicated channel, or EPG information on the Internet, or selecting and combining separate pieces of information to recompose EPG information. Accordingly, program selection and viewing based on more detailed control becomes possible. That is to say, it is possible to efficiently utilize contents, such as to search for a desired content from among a number of A/V contents, to classify contents into libraries, or to automatically display content.

According to the second aspect of the present invention, MPEG decoding can be efficiently performed from received data by transmitting a data block such that data in the beginning or end of the transmission data block corresponds with the data in the beginning of a data block managed on the sending side.

According to the third aspect of the present invention, by including an MPEG-2/H.264 transcoder, the size of a file can be reduced to about half or smaller with image quality maintained. Consequently, more files can be accumulated, and also an H.264 stream can be transmitted in real time in a narrower band or file transfer at a higher speed is possible.

According to the fourth aspect of the present invention, by synchronizing a 2-channel image which is made up of a left-eye image and a right-eye image based on IDR pictures in H.264, a stereoscopic image can be efficiently transmitted. In addition, when encoding a 3D (stereoscopic) image using MPEG-2 or H.264, since a left-eye image and a right-eye image typically resemble each other, the bit rate of the left-eye image can be made small by encoding the left-eye image with reference to the right-eye image. Consequently, in this case, the total bit rate can be limited to a bit rate about 1.5 times the bit rate of the right-eye image.

According to the fifth aspect of the present invention, it provides a method for storing metadata in an H.264 signal which is external input. Also, in a case where a music program is received on digital broadcasting, it is not necessary to find the start of a certain tune when the music program is transmitted live to another room. However, when the music program is received on digital broadcasting and once accumulated in the accumulation unit for subsequent viewing, the invention realizes easy access to a desired tune from among a plurality of tunes which were broadcast in the program.

According to the sixth aspect of the present invention, it realizes efficient editing in a case where an HD content in the MPEG-TS format which is taken with an HD movie and its metadata are accumulated in a home server. The HD/low definition conversion unit converts the HD content accumulated in the accumulation unit 1 into a content of a low definition and a low bit rate. When a content accumulated in the home server is to be remotely edited via a network from a PC in another room or a portable terminal, to send the HD content to the PC or the portable terminal, an accumulated low-definition content is transmitted to the receiving side in order to lessen the processing load on devices and network load. Also, as processing on the receiving side, an editing list (EDL) is created and the EDL is transmitted to the sending side. The sending side transmits an HD content edited based on the received EDL to the receiving side. By deleting unnecessary images in this way, the amount of data to be transmitted to the receiving side can be reduced.

BRIEF DESCRIPTION OF DRAWINGS

FIG. 20 is a diagram showing an example of metadata handled in the present invention;

FIG. 21 is a block diagram of the packet transmitting/receiving unit according to a seventh embodiment of the invention; and FIG. 22 is a diagram illustrating an application in the seventh embodiment of the invention.

DETAILED DESCRIPTION OF THE INVENTION

Embodiments of the present invention will be described in detail using drawings. Firstly, to clarify the positioning of the present invention, the overview of an exemplary communication system to which the present invention is applied will be described.

Figure 1:
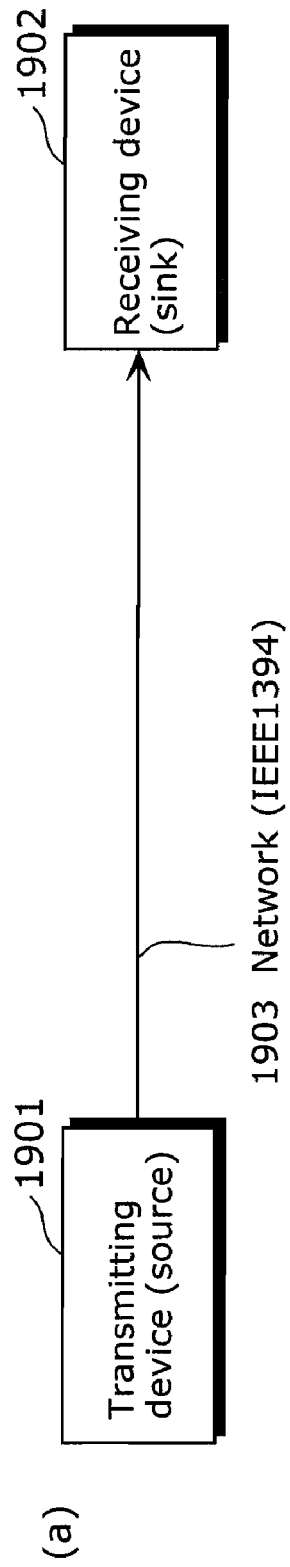
FIG. 1 is a diagram showing the configuration of a conventional packet transmitting/receiving system.
Figure 2:
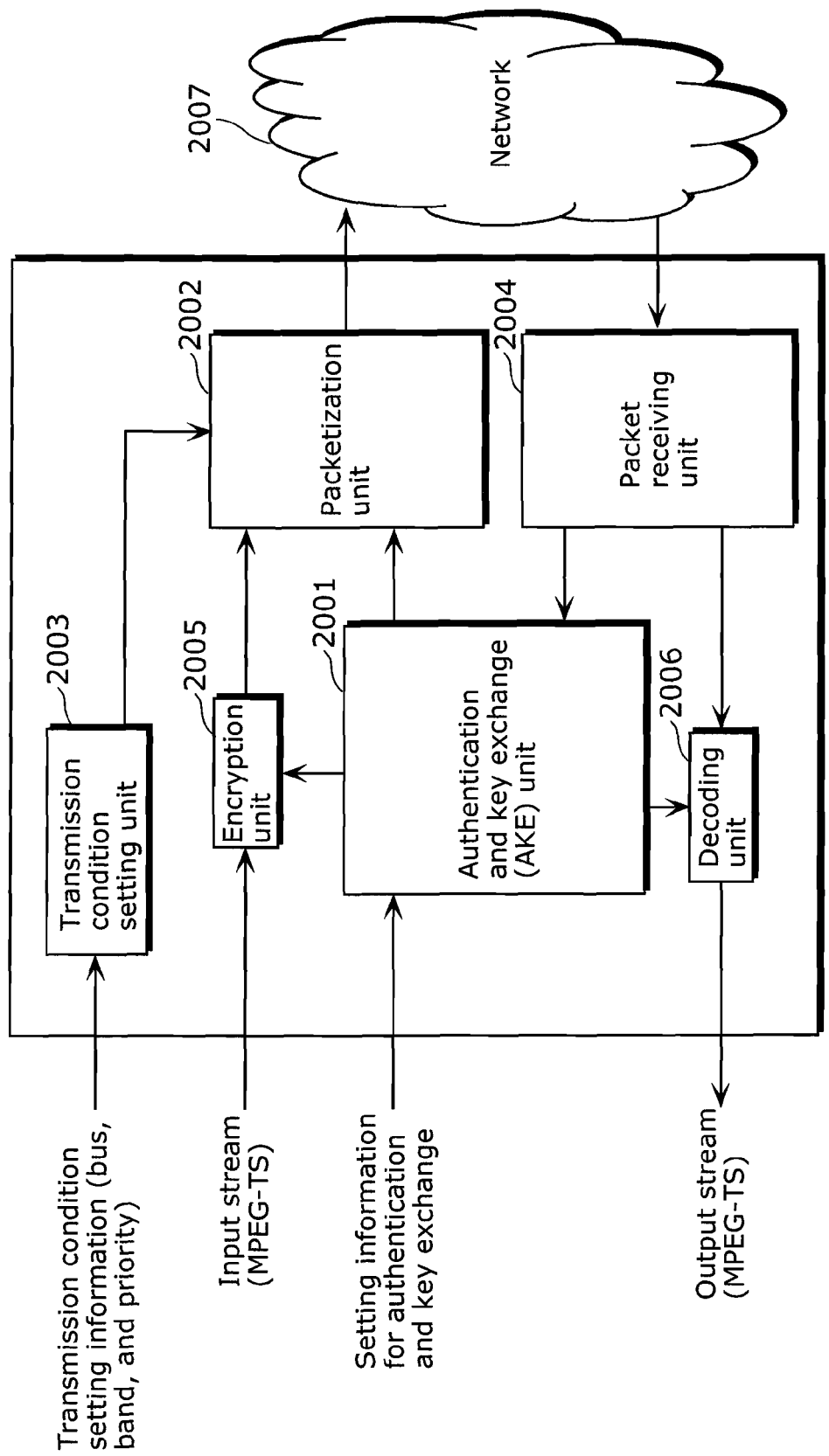
FIG. 2 is a diagram showing the configuration of a conventional packet transmitting/receiving apparatus.
Figure 3:
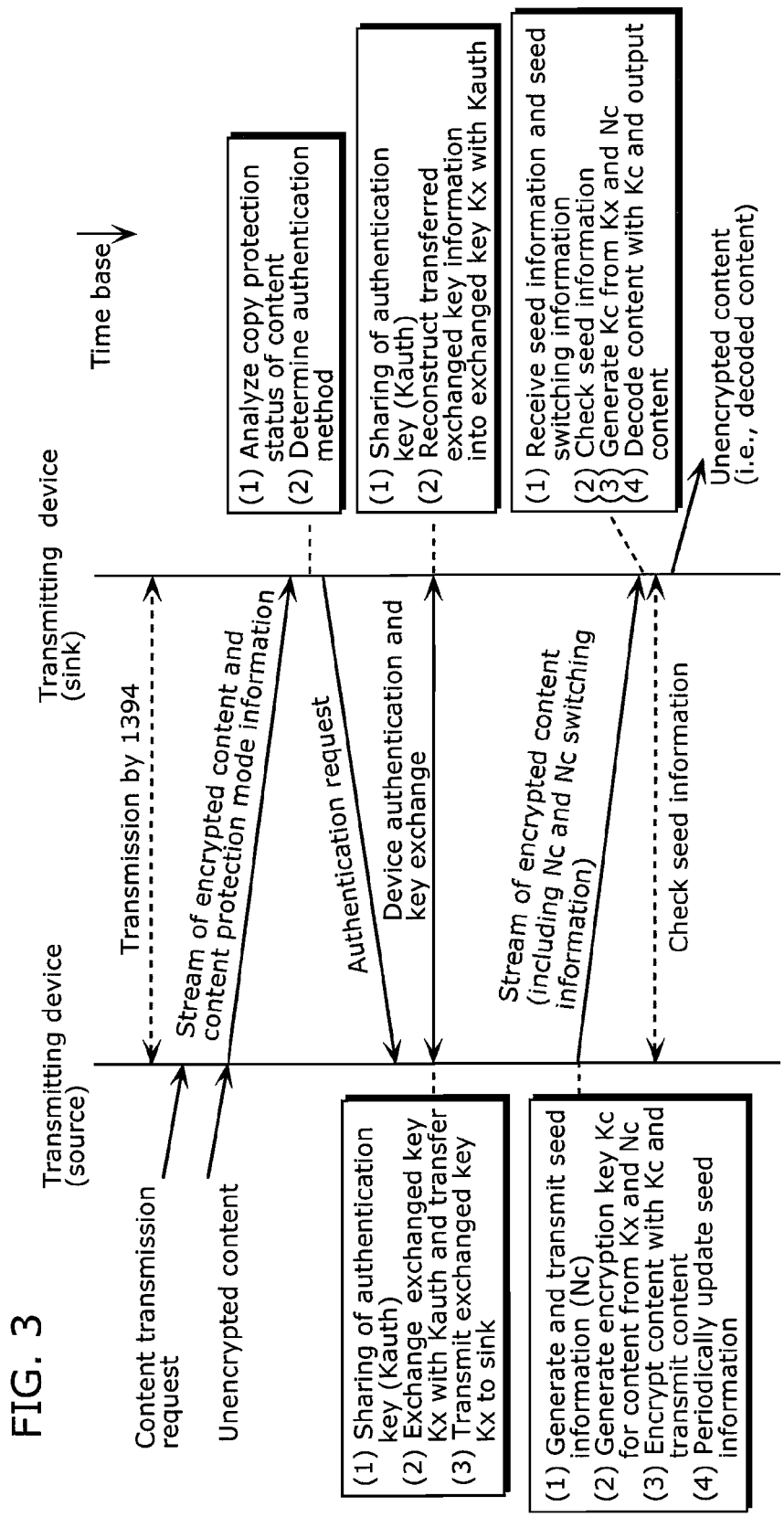
FIG. 3 is a diagram illustrating a conventional procedure of content transmission in a case where the DTCP method is applied to key exchange.
Figure 4:
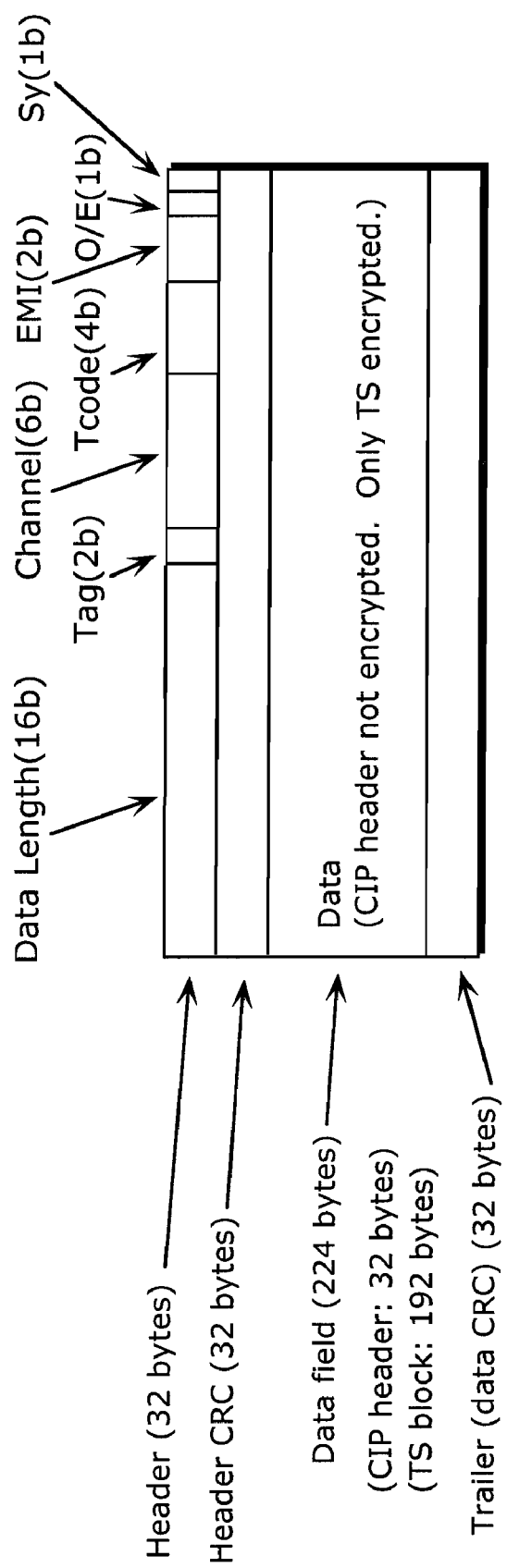
FIG. 4 is a diagram illustrating a conventional 1394 packet.
Figure 5:
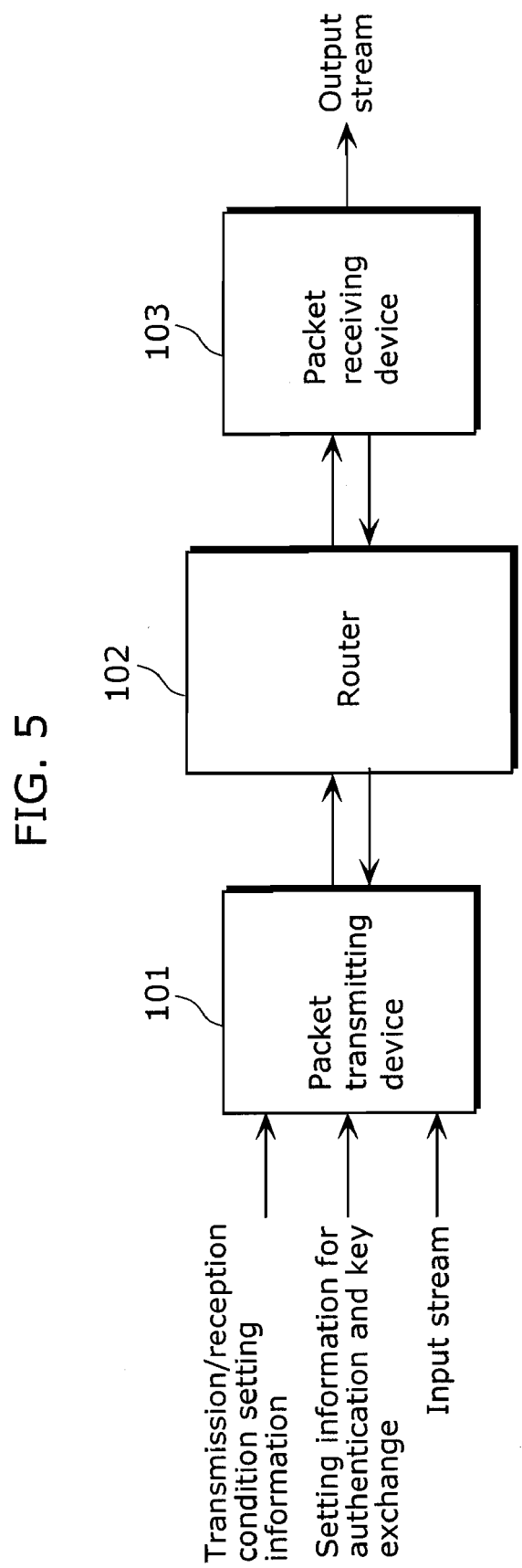
FIG. 5 is a conceptual diagram of a transmitting/receiving system according to the present invention.

FIG. 5 shows an example of the communication system to which the present invention is applied. This communication system is composed of a packet transmitting device 101 that transmits packets, a router 102 that performs packet routing, and a packet receiving device 103 that receives packets.

Figure 6:
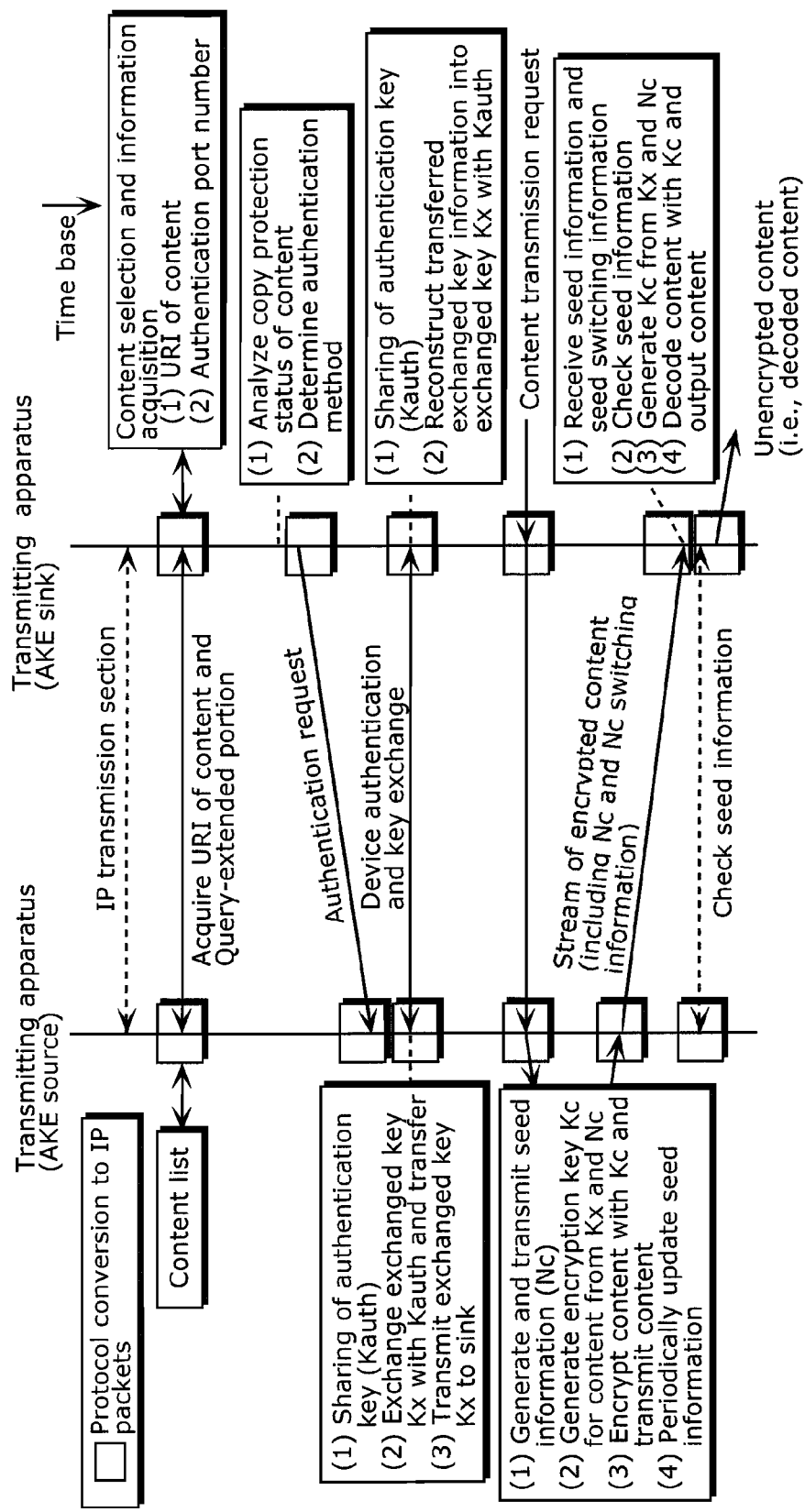
FIG. 6 is a diagram illustrating the procedure of content transmission according to the present invention for a case where the DTCP method is applied to key exchange.

To the packet transmitting device 101, setting information for transmission/reception conditions including management and operation of the device, setting information for authentication and key exchange, and an inputted stream (i.e., a content in the MPEG-TS format and the like) are inputted. The packet transmitting device 101 performs communication with the router 102 in accordance with the procedural steps 1 to 3 shown below as illustrated in FIG. 6. Here, the copyright protection for a transmitted content is realized based on copy protection using authentication and encryption.

<Procedural Step 1> Set Transmission/Reception Parameters.

(Procedural step 1-1) Set the Media Access Control (MAC) address, IP address, TCP/UDP (User Datagram Protocol) port number and the like of the packet transmitting and receiving devices. An automatic setting function of UPnP and the like may be employed.

(Procedural step 1-2) Set the type and band of a signal to be transmitted. Among the packet transmitting device 101 and the packet receiving device 103 which operate as Quality of Service (QoS) agents, and the router 102 which operates as a QoS manager, settings are made on the operation of a network using the IEEE 802.1Q (VLAN or Virtual LAN) standard.

(Procedural step 1-3) Set priority (operation according to IEEE 802.1Q/p).

<Procedural step 2> Authentication and key exchange.

(Procedural step 2-1) Perform authentication and key exchange. The DTCP method may be used, for example.

<Procedural step 3> Stream transmission.

(Procedural step 3-1) Transmit an encrypted stream content (a partial MPEG-TS) between the packet transmitting device and the packet receiving device.

Note that although the MPEG-TS is used in the above example, it is not limited to such. The applicable range of an inputted content for use in the present invention includes MPEG-TS streams such as MPEG1/2/4 (ISO/IEC13818), streams standardized by MPEG-PS(Program Stream), MPEG-ES (Elementary Stream), MPEG-PES (Packetized Elementary Stream), DV(IEC61834, IEC61883), SMPTE (Society of Motion Picture & Television Engineers) 314M (DV-based), SMPTE259M(SDI), SMPTE305M (SDTI), SMPTE292M (HD-SDI), ISO/IEC H.264, and so forth. Furthermore, general A/V contents are also applicable.

Furthermore, inputted data for use in the present invention is also applicable to file transfer. In the case of file transfer, even content transmission faster than real time is possible under a condition in which the data transfer speed becomes greater than a normal reproduction data rate of a content stream depending on the relationship between the processing capability of the transmitting and receiving apparatuses and transmission delay time between those apparatuses.

Next, the authentication and key exchange at procedural step 2 will be additionally described. In FIG. 5, the packet transmitting device 101 and the packet receiving device 103 are connected by an IP network. First, a signal format, property information, protection/control mode information for copying or outputting and the like which relate to a content are transmitted from the packet transmitting device 101 to the packet receiving device 103.

The packet receiving device 103 analyzes the signal format, property information, and protection and control mode information and the like relevant to the content, determines an authentication method to use, and transmits an authentication request to the packet transmitting device 101. Through these processes, the packet transmitting device 101 and the packet receiving device 103 share an authentication key.

Then, the packet transmitting device 101 encrypts an exchanged key using the authentication key and transmits the exchanged key to the packet receiving device 103, which decodes the exchanged key.

The packet transmitting device 101 generates key change information that changes at intervals of a certain data amount for making the encryption key change at intervals of a certain data amount (or at intervals of a certain time period or upon detection of a command or a signal), and transmits the information to the packet receiving device 103.

The packet transmitting device 101 generates an encryption key from the exchanged key and key change information, encrypts an MPEG-TS in the encryption unit using the encryption key, and transmits the MPEG-TS to the packet receiving device 103.

The packet receiving device 103 reconstructs a decoding key from the received key change information and exchanged key. The packet receiving device 103 uses this decoding key to decode the encrypted MPEG-TS signal.

In this manner, a content is transmitted between the packet transmitting device 101 and the packet receiving device 103 while protecting the copyright of the content based on copy control.

Figure 7:
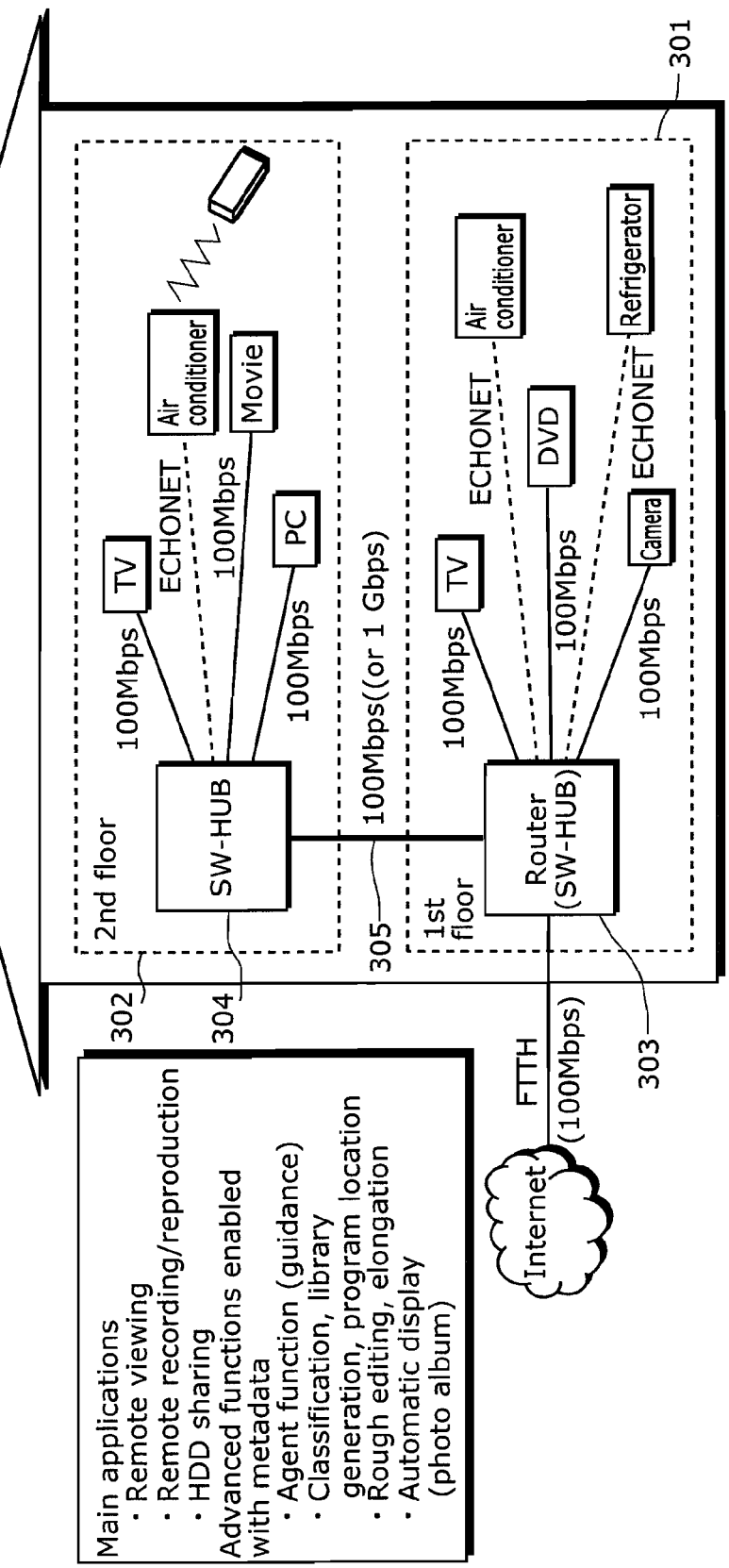
FIG. 7 is a diagram illustrating an example of a case where the present invention is applied to an ordinary household which uses Ethernet (TM)

FIG. 7 shows an example of a case where this method is applied to a two-story house that has a LAN based on Ethernet™. This house has a network system 301 which includes a router 303 installed on the first floor and a network system 302 which includes a switching hub 304 installed on the second floor. A network 305 is an Ethernet™ network for connecting between the router 303 and the switching hub 304. Here, the network system may be a subnet which is set with a subnet mask of Internet Protocol (IP). The band of all Ethernet™ networks in the house is 100 Mbps.

Also, the router 303 is made operate as a switching hub for the in-home networks in order to combine the networks on the first and the second floors and have them operate as the same subnet. However, the router 303 configures those networks as separate subnets outside the house. By thus building a single subnet in the house, it is possible to confine encrypted communication described above to within the subnet, namely, within the house, by limiting the TTL of encrypted IP packets described above to 1.

The network system 301 on the first floor has a configuration in which a television (TV), a camera, and a DVD recorder are connected to the router 303 by an Ethernet (™) of 100 Mbps, and an air conditioner and a refrigerator are connected to the router 303 by ECHONET.

On the second floor, a television (TV), a personal computer (PC), and a movie are connected to the switching hub 304 by an Ethernet™ of 100 Mbps, and an air conditioner is connected to the switching hub 304 by ECHONET. The ECHONET is a transmission method developed by the Echonet Consortium www.echonet.gr.jp/.

In this house, the TVs that receive a content subject to digital copyright protection from broadcasting and distribute the content to individual devices in the house (the air conditioners, DVDs, PCs, and refrigerator) as IP packets correspond to the packet transmitting device 101 of the present invention, and each of the devices corresponds to the packet receiving device 103, for example.

In FIG. 7, the personal computers (PC), DVD recorders, router 303 and switching hub 304 support IEEE802.1Q (VLAN). That is to say, when the data rate is the same (e.g., 100 Mbps) at all the ports of the router 303 and the switching hub 304, data inputted to an input port is all outputted to an output port without being lost inside the router (or the switching hub) unless the sum of data bands which are outputted to a specific port exceeds the specification value or actual value of the transmission rate for that port.

In the switching hub, even when data are simultaneously inputted to eight input ports, for example, the individual data are switched in a buffer of the hub without confliction and outputted from output ports as long as the output ports for the individual data are different, so that the inputted data is all outputted to the output ports without packet loss.

In FIG. 7, since the band of all Ethernets™ in the house is 100 Mbps, the band of the network 305 between the first floor and the second floor is also 100 Mbps. When a plurality of data flow among a plurality of devices on the first floor and the second floor, if there is no band limitation on each of the data, the total data rate of the data flowing over the network 305 may exceed 100 Mbps, and a stream that requires real-time transmission, such as a video application in a partial MPEG-TS, may be interrupted. In this case, to prevent the interruption of a stream which requires real-time transmission, the band of the network 305 between the first and second floor can be increased to 1 Gbps, or alternatively, priority control among transmission data is required. Such priority control can be realized by introducing a speed limiting mechanism for stream transmission or file transfer, which will be described later, not only in terminals but also in the router and/or the switching hub.

For example, when the transmission priority of a partial MPEG-TS stream is made higher than that of file transfer data, an encrypted MPEG-TS can be transmitted in real time among the DVD recorders, PCs and TVs on the first and second floors utilizing the HTTP or RTP protocol while performing file transfer between the PCs on the first floor and the second floor in background.

A partial MPEG-TS is a kind of MPEG-TS stream and is described in the ARIB standard, STD-B21, for example. Also, the overview, configuration, and operation of the HTTP protocol (IETF standards, RFC 2616 and RFC 1945) are described in "Rensai: Internet Protocol shousetsu (1), HTTP (Hyper Text Transfer Protocol), zenpen" ("Series: Details on Internet Protocol (1), HTTP (Hyper Text Transfer Protocol), Part I"), for example.

The transmission speed limitation mechanism for the router 303 or the switching hub 304 mentioned above can be realized by controlling data inflow. Specifically, the mechanism can be realized by comparing data of high priority with data of low priority in an inputted data queue in the router (or the switching hub) and preferentially outputting the data of higher priority. A buffer control rule for use in this priority control method may be the round robin method, fluid fair scheduling method, weighted fair scheduling method self-synchronization fair scheduling method WFFQ method, virtual clock scheduling method, class-based scheduling method, and so forth. Information on these scheduling methods is provided in Chapter 12 of "Network QoS gijutu ("Network QoS Techniques)", Iwao Toda, May 25, 2001 (first edition), published by Ohmsha, for example.

It is possible to determine an encryption mode and a method for transmitting content attribute information (or property) for transmitting an A/V content between a transmitting terminal and a receiving terminal by transmitting attribute information of an A/V content that can be detected and extracted from a digital broadcast signal received via terrestrial digital broadcasting, BS digital satellite broadcasting, 110-degree CS digital satellite broadcasting, or a CATV and/or the Internet between the transmitting terminal and the receiving terminal using a data exchange protocol, such as Universal Plug and Play (UPnP)-A/V and HTTP. Additionally, since a rule for adding an encryption information header can be defined, signal compatibility can be secured while maintaining the secrecy of A/V streams between packet transmitting and receiving devices. Standard specifications of UPnP and UPnP-A/V are released at http://upnp.org. At http://upnp.org, in relation to MediaServer V 1.0 and MediaRenderer V 1.0, the following specifications are disclosed, for instance: MediaServer V 1.0, MediaRenderer V 1.0, ConnectionManager V 1.0, ContentDirectory V 1.0, RenderingControl V 1.0, A/VTransport V 1.0, and UPnPTM A/V Architecture V 0.83.

Also, in relation to the transmission of A/V contents using a network, data tapping on the network is prevented to realize data transmission of high security. This can prevent tapping and leakage of priority data (A/V data contents) that is transmitted in real time even when a public network such as the Internet is used as the transmission channel. Marketing and billing of A/V data which is transmitted over the Internet and the like is also enabled, which enables marketing and distribution of contents in B-B (B to B) and B-C (B to C) which require higher security.

Furthermore, even when an A/V content is separated from transmission data and part of transmission protocol processing is accelerated with hardware, general data packets which are not an A/V content can be processed with software using a processor in a conventional manner. Accordingly, by adding software, data such as management or control information can be transmitted as general data. Since the amount of such general data which are not A/V contents is generally very small compared to A/V data as priority data, the general data can be processed with an inexpensive microprocessor such as a microcomputer, which can realize a system at a low cost. Since an expensive CPU or a bulk memory is not required for protocol processing for priority packets with high load and a high transmission rate either, an inexpensive and high-performance apparatus can be provided in this respect as well.

Also, a client that does not support RMP can be allowed to view a content whose viewing or copying is limited with RMPI (Rights Management & Protection Information), including billing information for use in RMP for server-based broadcasting and the like, in the form of CNM (Copy No More) or CN (Copy Never), which can accelerate the proliferation of server-based broadcasting. In this case, a copyright managing unit is employed that handles billing information, copy control information, validity period information, available reproduction count information and the like for performing reproduction control, output control, or copy control of A/V data based on control information, and that supplies generated information to an authentication unit as authentication information. The authentication unit performs authentication processing with the packet receiving apparatus based on the authentication information supplied from the copyright managing unit to thereby perform reproduction control, output control, or copy control of the A/V data on the packet receiving apparatus. The packet transmitting apparatus further includes a content purchase/payment unit that makes purchase and payment of a content which is subject to copyright protection with the packet receiving apparatus under control of the copyright managing unit and based on billing information, reproduction control information, or copy control information.

First Embodiment

Figure 8:
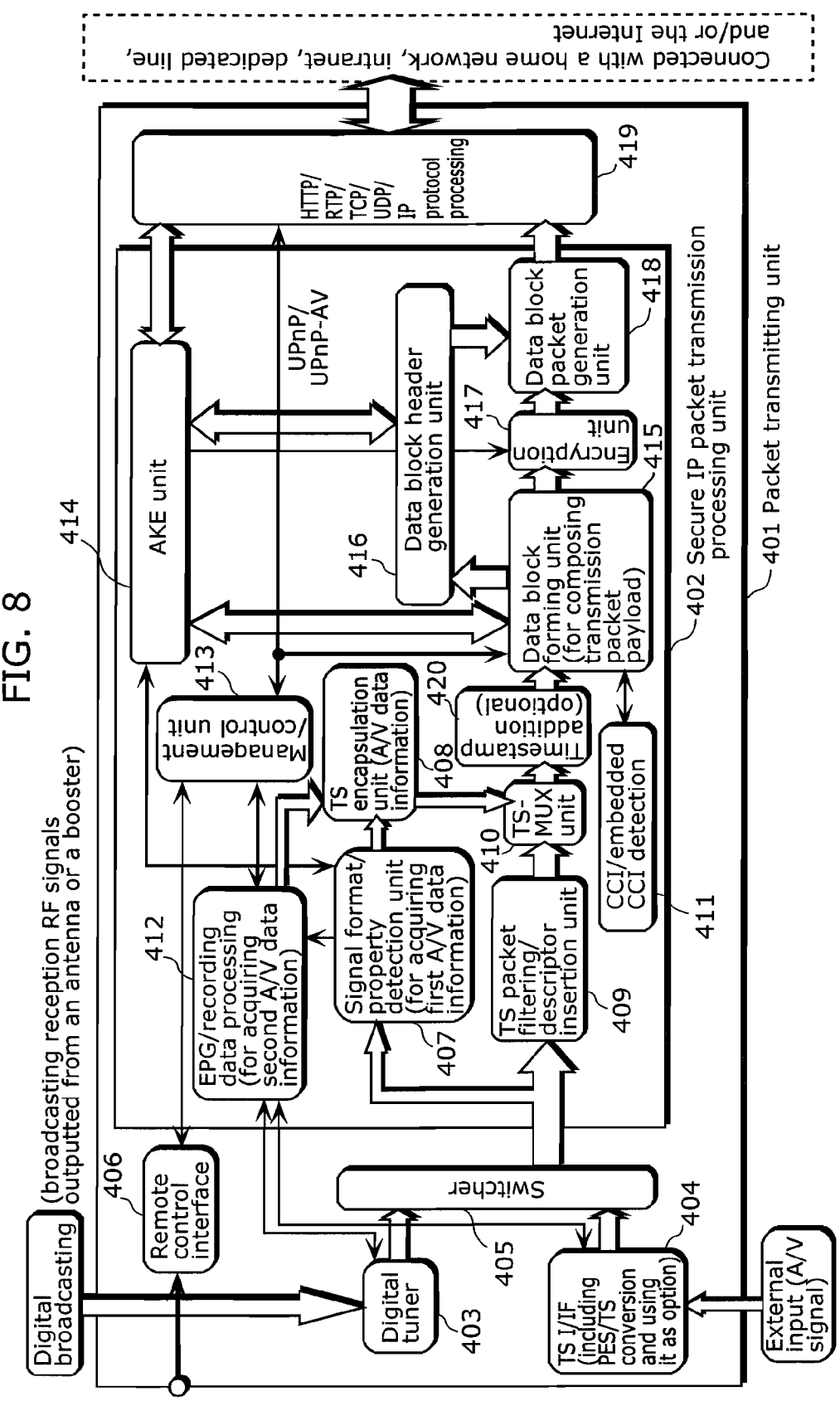
FIG. 8 is a block diagram of a packet transmitting unit according to a first embodiment of the invention.

A first embodiment of the invention will be first described. FIG. 8 is a block diagram showing the configuration of a packet transmitting unit 401 according to the present embodiment. The packet transmitting unit 401 is an apparatus for transmitting and receiving packets through encryption which is set based on AKE, and includes a secure IP packet transmission processing unit 402 as the core. The packet transmitting unit 401 includes a digital tuner 403, a TS interface 404, a switcher 405, a remote control interface 406, a signal format/property detection unit 407, a TS encapsulation unit 408, a TS packet filtering/descriptor insertion unit 409, a TS-MUX unit 410, a CCI detection unit 411, an EPG/recording data processing unit 412, a management/control unit 413, an authentication/key exchange (AKE) unit 414, a data block forming unit 415, a data block header generation unit 416, an encryption unit 417, a data block packet generation unit 418, a transmission protocol processing unit 419, and a timestamp adding (addition) unit 420.

Here, the EPG/recording data processing unit 412 represents an example of program information acquisition means and program information recomposition means, the TS packet filtering/descriptor insertion unit 409 represents an example of filtering means, and a set of the data block forming unit 415, data block header generation unit 416, data block packet generation unit 418, and transmission protocol processing unit 419 represents an example of transmission means.

When viewed separately, the data block forming unit 415, data block header generation unit 416, data block packet generation unit 418 represent an example of data block forming means, transmission packet header generation means, and transmission packet generation means, respectively.

Also, the TS packet filtering/descriptor insertion unit 409 represents an example of descriptor insertion means, and the TS-MUX unit 410 represents an example of partial transport generation means.

In the following, the function of each of the components will be described in accordance with the transmission procedure.

To the management/control unit 413, A/V data and metadata as management and control data are inputted. For example, A/V data information including input terminal information for A/V data (i.e., a transmitted content), data format information for the A/V data, and attribute information indicating the property (attribute) of the A/V data is inputted to the management/control unit 413. Specifically, these pieces of information represent setting information for transmission conditions, such as the type of transmission data, information on a destination address and a port number, information on a path for use in transmission (routing information), the band of the transmission data, and the transmission priority of the transmission data, management and control data for devices at the transmitting unit (i.e., local) and the receiving unit (i.e., remote), and data for feeding back reception conditions to the sending side. The management/control unit 413 uses the inputted information to control the generation of headers and/or payload data (e.g., parameter setting) at the data block forming unit 415 and the protocol processing unit 419.

Although omitted in the packet transmitting unit 401, when the signal to be handled is an MPEG-TS signal, input terminal information for the transmitted signal can include (1) an input terminal for digital broadcasting (in Japan, an RF input terminal compatible with terrestrial digital broadcasting, BS digital broadcasting, and 110-degree wideband CS digital broadcasting), (2) IEEE1394 D-I/F, (3) USB-I/F, (4) IP-I/F (identification of an Ethernet (™) and/or a wireless LAN), (5) analog video/audio input (in this case, inputted analog video/audio is converted to an MPEG-TS signal in the packet transmitting/receiving unit 401), and the like. For digital broadcasting, a commentary article is provided in the Gakkaishi (Journal) of Institute of Image Information and Television Engineers, Vol. 58, No. 5, pp. 604 to 654, for example.

When the signal to be handled is a partial MPEG-TS, the data format information indicating the format of an A/V signal in the packet transmitting/receiving unit 401 represents the MIME-Type or media format of the partial MPEG-TS. For example, the transmitting unit (i.e., server) and the receiving unit (i.e., client) define media formats for a still picture medium, a music medium, and a moving picture medium they handle. For example, media formats for moving pictures (video) include MPEG2, MPEG1, MPEG4, WMV, and so forth. Also, media formats for still pictures include JPEG, PNG, GIF, TIFF and so forth. Media formats for music include Linear PCM, AAC, AC3, ATRAC3plus, MP3, WMA, and so forth. Such formats are similarly defined by the DLNA (Digital Living Network Alliance, its web site at www.dlna.org) as well, for example. The DLNA Guideline, Version 1.0 refers to a server (the transmitter of a content, the source in DTCP) as a DMP (Digital Media Server) and a client (the receiver of a content, the sink in DTCP) as a DMP (Digital Media Player). The DMS is composed of a Media Server (MS) and a Control Point (CP) of UPnP-A/V, and the DMP is composed of a Media Renderer (MR) and a Control Point (CP) of UPnP-A/V. The MS, MR and CP of UPnP-A/V are described on the web site of UPnP, www.upnp.org.

In the case of a video media format, the data format information includes, as additional parameters, (1) identification of resolution (SD, HD), (2) identification of a TV system (for analog, NTSC, PAL, and SECAM, and for digital, broadcasting systems such as ATSC of the US, DVB in Europe, and Japan's ISDB based on the ARIB standard), (3) presence/absence of additional information such as a timestamp format, and the like. In the case of video, for example, since its MIME-Type is "mpeg/video" for both an MPEG-PS and an MPEG-TS, more detailed handling and control of a video medium is enabled by using such additional information as shown above.

An outline of the ARIB standard pertaining to digital broadcasting is provided in Matsushita Technical Journal, February 2004, Vol. 50, No. 1, pp. 7 to 12, for example.

When the A/V signal to be handled is an MPEG-TS signal which is broadcast by a broadcasting station through the terrestrial digital broadcasting system of Japan and tuned on a receiver in a home and the like (to be exact, a partial transport signal (partial TS signal) which is defined as an inputted/outputted transport stream to/from a serial interface in Chapter 9 of the ARIB standard, ARIB STD B21), for example, the attribute information indicative of the attribute of A/V data in the packet transmitting/receiving unit 401 include a channel name (the name of the broadcasting station), a channel number, a program title, a program category, a scheduled start time of broadcasting, a scheduled end time of broadcasting, information on the substance of the program, the resolution of the program, viewing limiting information such as parental control, copy control information, a viewing fee, and the like, which are transmitted by the broadcasting station as PSI/SI information. The PSI and SI are defined in ARIB technique materials, ARIB TR-B14 and ARIB TR-B15.

In FIG. 8, an RF signal received from an antenna compatible with digital broadcasting is inputted to the digital tuner 403, in which a channel is selected, and a full TS is inputted to the switcher 405. Meanwhile, to the TS interface 404, MPEG-TS signals for HDTV (e.g., 1080i, 720p) and SDTV (525i) and/or recording information (i.e., metadata) relating to the MPEG-TS signals are inputted in the MPEG-TS format from a digital movie that is capable of recording in recording modes of HDTV (1080i, 720p and so on) and SDTV (525i), for example. The switcher 405 selects between input from the digital tuner 403 and output from the TS interface 404 and outputs the selected one. The output selection of the switcher 405 can be executed from a remote control via the remote control interface unit 406 or from the management/control unit 413 which internally has memory and a microcomputer, for example. To keep the figure from becoming complex, a signal line between the management/control unit 413 and the switcher 405 is omitted in FIG. 8. Similarly, though omitted in the drawings of the present invention for the sake of brevity, the management/control unit 413 is connected with all the modules through signal lines and can manage or control the operation of the modules.

The MPEG-TS selected by the switcher 405 is inputted to the signal format/property detection unit 407 and the TS packet filtering/descriptor insertion unit 409.

The TS signal inputted to the signal format/property detection unit 407 is inputted to the EPG/recording data processing unit 412, in which EPG information for broadcasting and/or metadata relating to recording with a movie and the like is extracted and passed to the management/control unit 413. Here, EPG information for broadcasting includes the three types shown below, for example.

(1) EPG information extracted from SI information which is contained in a digital broadcasting signal (2) EPG information extracted from an EPG dedicated channel, e.g., EPG information provided in TV programs of Gemstar or NANO Media.

(3) EPG information acquired from the Internet, e.g., EPG information acquired from television guide sites. In a broader sense, metadata for broadcast programs which is acquired from television blog sites may be included in this type of EPG information.

Here, EPG information from the Internet is acquired via the protocol processing unit 419 and the management/control unit 413.

The EPG information includes the type of a broadcasting system, identification of a broadcasting network, broadcasting schedule/channel information, program title, program category, channel number, start time of a program, ending time of a program, program description (a simple description version and a detailed description version) and so forth.

The EPG/recording data processing unit 412 can not only select desired EPG information from among the multiple kinds of EPG information shown above but select and combine separate pieces of EPG information to recompose EPG information.

The EPG/recording data processing unit 412 can also maintain and preserve the attribute of the information sources during such combination and recomposition of information. For example, using a mechanism of UPnP-A/V, information sources can be preserved by representing the attribute of the three information sources shown above like @SI, @EPG-dedicated channel 1, and @Internet_information_source 1, respectively.

While EPG information is traditionally composed only from SI information contained in broadcasting wave, a characteristic of the present invention also lies in that it can acquire EPG information from a number of information sources and recompose new EPG information from the EPG information.

For instance, EPG information including airtime information may be acquired from broadcasting wave and also EPG information including more detailed description of a program may be acquired from the Internet. Then, the airtime information and the program description may be recomposed into new EPG information. This can provide desirable EPG information that includes new airtime information that is likely to reflect possible extension or change of the program as well as detailed description of the program.

It is also possible to select EPG information for use in recomposition in accordance with the attribute of a receiving apparatus which is supposed to be the recipient of recomposed new EPG information.

For example, when the receiving apparatus is a portable information terminal apparatus, program description which is contained in EPG information from broadcasting wave may be used taking into consideration that the display screen of the apparatus is not so large. Also, when the receiving apparatus is a personal computer, for example, EPG information in a broad sense that can be obtained by accessing a favorite television blog site of the user of the personal computer may be recomposed into new EPG information. The address of a television blog site to access can be acquired in advance from the personal computer as the receiving apparatus.

The user can reference the new EPG information recomposed in such a manner and make use of it for program selection.

The EPG information may be displayed on a television receiver not shown and a program selection operation performed by the user upon seeing the information may be accepted via the remote control interface 406. Or the EPG information may be transmitted to and displayed on a television receiver in another room via a home network in conformity with standards and specifications for remote display and control of metadata, such as program information, which are defined by UPnP-A/V or the DLNA guideline, and an operation for program selection which is performed by the user seeing the information in that room may be accepted via the home network, for example. When a content recorded with a movie is displayed, a listing of recorded files can be displayed in list format with recording data (i.e., metadata) just like EPG information.

From the TS signal inputted to the signal format/property detection unit 407, the TS encapsulation unit 408 recomposes a Selection Information Table (SIT) and the like for TS packets having the PID of a program which was selected in the above manner, and outputs the SIT to the TS-MUX unit 410.

For the TS signal inputted to the TS packet filtering/descriptor insertion unit 409, DTCP audio descriptors are generated for TS packets having the PID of the program selected in the above-described manner, and the descriptors are inserted into a Program Map Table (PMT). Thereafter, filtering for extracting only TS packets that represent the selected program is performed based on the PID of TS packets, and extracted TS packets are outputted to the TS-MUX unit 410.

The TS-MUX unit 410 performs multiplexing of the TS packets (TS-MUX) which are output from the TS packet filtering/descriptor insertion unit 409 and the TS encapsulation unit 408, and outputs multiplexed TS packets to the data block forming unit 415. Here, when output from the TS packet filtering/descriptor insertion unit 409 and output from the TS encapsulation unit 408 coincide with each other, priority is given to the output of the TS packet filtering/descriptor insertion unit 409 in consideration of the accuracy of timestamp addition at a later stage, and output from the TS encapsulation unit 408 is delayed.

The timestamp adding unit 420 adds a 32-bit timestamp to each TS packet at a 27 MHz clock. In the case of movie output, it is also possible to adopt a configuration of adding a timestamp at the time of output from a movie. In this case, the switcher handles time-stamped TSs, and may output time-stamped TSs to the TS packet filtering/descriptor insertion unit 409 and supply TS packets from which timestamps are removed to the signal format/property detection unit 407. The timestamp adding unit 420 then adds timestamps only to packets that have no timestamp (i.e., output from the TS encapsulation unit).

The data block forming unit 415 uses the CCI detection unit 411 to detect whether any CCI is present in the data block. Here, when the CCI (copy control information set in the first or second loop of a PMT) of a content in the transmitted TS is CNM (Copy No More), COG (Copy One Generation), or CN (Copy Never), if no CCI is present in the data block, embedded CCI is not present in an encrypted block. Thus, output according to the IP protocol based on DTCP (DTCP-IP) and the like is inhibited.

The AKE unit 414 internally has an authentication unit and an encryption key exchange unit. The CCI of the TS signal detected in the signal format/property detection unit 407 is sent to the authentication and AKE unit 414. Here, when the CCI is other than CF (Copy Free), that is, any of CNM (Copy No More), COG (Copy One Generation), and CN (Copy Never), authentication and key exchange (AKE) is performed. The AKE unit 414 acquires setting information for authentication and key exchange (AKE setting information), and outputs information relevant to the AKE setting information, e.g., copy protection information and encryption key change information, to the data block forming unit 415, data block header generation unit 416, and/or the encryption unit 417.

The AKE unit 414 performs authentication processing by verifying that the packet transmitting apparatus and the packet receiving apparatus meet required conditions, such as being guaranteed to be authorized devices by a certificate authority and the like. After the authentication processing, an encryption key is shared by the packet transmitting apparatus and the packet receiving apparatus, and the encryption key is updated with input terminal information, data format information, attribute information, and a transmission condition which is generated from billing information, copy control information, validity period information, and available reproduction count information. An encrypted data generation unit encrypts A/V data using the encryption key.

The data block forming unit 415 converts a time-stamped partial MPEG-TS inputted from the TS-MUX unit 410 into blocks of a certain length in accordance with transmission parameters given by the management/control unit 413. This data block length is inputted to the data block header generation unit 416.

The data block header generation unit 416 generates a data block header that contains size information indicating the specific length and also contains control information when the detected data format information or attribute information is control information relating to the transmission, duplication, or reproduction of the content data.

Block data converted to blocks in the data block forming unit 415 is inputted to the encryption unit 417. The encryption unit 417 performs Advanced Encryption Standard (AES) encryption using the encryption key supplied from the AKE unit 414. As the encryption method, a general encryption method such as Data Encryption Standard (DES) may also be used in addition to AES. The data blocks encrypted in the encryption unit 417 are inputted to the data block packet generation unit 418. The data block packet generation unit 418 combines the data block header, which was generated by the data block header generation unit 416 and should be added to the data blocks, with the inputted data blocks into transmission packets.

The transmission packets are inputted to the protocol processing unit 419, in which they go through protocol processing for HTTP, TCP, IP and so on, and passed to the Ethernet™ MAC layer to become Ethernet™ frames. The frames are transmitted over an in-home network to transmit the content to a television receiver in another room using TSs.

The AKE unit 414 has an authentication execution mode and an authentication non-execution mode between the packet transmitting apparatus and the packet receiving apparatus. The encrypted data generation unit provides control for adding data block headers regardless of whether the AKE unit 414 is in the authentication execution mode or in the authentication non-execution mode. That is, the encryption unit 417 includes and adds encryption mode information generated from CCI into a data block header when copy control information (CCI) indicates that copy control is to be implemented. When the copy control information indicates that copy control is not to be implemented, the encryption unit 417 can also be controlled to not add a data block header.

Further in this case, the AKE unit 414 can also perform authentication with the packet receiving apparatus based on input terminal information, data format information contained in EPG information, attribute information, and an authentication condition which is generated from billing information, copy control information, validity period information and available reproduction count information. Here, the packet transmitting apparatus further includes an access position notifying unit which notifies the packet receiving apparatus of control authentication information which is composed of data format information, attribute information, and at least one of billing information, copy control information, validity period information, and available reproduction count information as a list of the programs in the form of URI information that specifies an access position for each program of A/V data or URI information extended with Query which relates to an AKE address and a port.

Alternatively, the packet transmitting apparatus may further include an access position notifying unit that, upon receipt of a request for transmitting a program list from the packet receiving apparatus, notifies the packet receiving apparatus of control authentication information which is composed of data format information, attribute information, and at least one of billing information, copy control information, validity period information, and available reproduction count information, as a program list in the form of URI information that specifies an access position for each program of A/V data or URI information extended with Query which relates to an AKE address and a port.

Also, the packet transmitting apparatus may further include an access position notifying unit that, when copy control information for a unit program of A/V data indicates that copy control is not to be implemented, generates two MIME-Types including a first MIME-Type that represents data format information for the A/V data and a second MIME-Type that represents data format information for data which is made up of A/V data with the encryption information headers intermittently added thereto, and presents information on two extended URIs for specifying an access point for each program of A/V data to the packet receiving apparatus.

Also, the information on two URIs is used for specifying URIs of "res" in Universal Plug and Play (UPnP), and the two MIME-Types identify contents by being inserted in the third field of protocolInfo, which is an attribute of the res.

The packet transmitting apparatus may further be configured to have first and second buffers for temporarily maintaining A/V data and non-A/V data (metadata such as EPG information), respectively, which are transmitted to the packet receiving apparatus, and control priority so that data maintained in either of the first or second buffer is preferentially transmitted to the packet receiving apparatus. In this case, the management/control unit 413 is characterized in that it performs priority control such that A/V data is preferentially outputted from the first buffer while keeping from overflow of non-A/V data in the second buffer.

The protocol processing unit 419 may also be characterized in that it, when Transmission Control Protocol (TCP) is determined as the transmission protocol for A/V data by the management/control unit 413, makes a TCP connection a perpetual connection to perform the transmission. In addition, the authentication unit is characterized in that it performs authentication and key exchange for sharing an encryption key with the packet receiving apparatus in accordance with the Digital Transmission Content Protection (DTCP) method.

When performing packetization in accordance with HTTP, the protocol processing unit 419 performs packetization with a range request or a data acquisition command. When data to be transmitted is MPEG, the protocol processing unit 419 can also perform the packetization by referencing at least one information from among time-based discontinuity occurrence information or continuity information within an MPEG stream, position information for an MPEG I picture, P picture or B picture in an A/V data file, time information for an MPEG I picture, P picture or B picture, the respective numbers or total number of P and B pictures that are present between a certain I picture and the next I picture.

As position information or time information for an MPEG I picture, P picture, or B picture in a file of A/V data, the protocol processing unit 419 can also generate I-picture, P-picture or B-picture position information or time information which is common among a number of different formats from position information or time information for a plurality of I, P or B pictures which is originally provided even when the A/V data are of a number of different formats, and using this common I-picture, P-picture or B-picture position information or time information, perform reference information to the position information or time information for an MPEG I picture, P picture, or B picture within the file of the A/V data and the packetization.

Also, when performing packetization in accordance with HTTP, the protocol processing unit 419 performs the packetization by a chunk transmission method, and can also perform the packetization so that the payload length of an HTTP packet is of a value determined on the packet transmitting apparatus.

When performing packetization in accordance with HTTP, the protocol processing unit 419 can also perform the packetization so that the payload length of HTTP packets is the length of data which is made up of an encryption information header and an integer number of transport packets (TSs, each 188-byte length) (i.e., a length equal to the encryption information header plus an integer multiple length of 188 bytes), or the length of data which is made up of a data block header and an integer number of time-stamped TSs (one TS plus a 4-byte timestamp totals a length of 192 bytes,) (i.e., a length equal to the encryption information header plus an integer multiple length of 192 bytes).

The protocol processing unit 419 can also perform HTTP transmission by switching between the range request method and the chunk transmission method.

For transmission by HTTP, the protocol processing unit 419 performs chunk transmission when the output of the packet transmitting apparatus is a received signal for live broadcasting, switching of a reception channel for live broadcasting, or a reproduction signal at the time of selecting an accumulated program, and uses a range request when the output is a reproduction signal from a program reproduced from an accumulation medium after program selection: it performs reproduction by switching between the two transmission methods.

The protocol processing unit 419 can also transmit the A/V data switching between transmission by HTTP and transmission by RTP so as to realize detailed reproduction control.

Next, using FIG. 9, processing on the receiving side will be described. A receiving unit 501 is configured with a secure IP packet reception processing unit 502 as the core. On the receiving side, a protocol processing unit 503 receives Ethernet™ frames inputted from the network by filtering them based on MAC headers, and reconstructs IP packets. Since the MAC address of a device is not transmitted beyond a Subnet boundary in a router in a general Ethernet™ system, the range of IP packet transmission can be confined to within the Subnet of an IP address by registering the MAC addresses of the transmitting and receiving devices in advance and identifying the other party of communication based on the MAC addresses.

A data block packet receiving unit 504 identifies headers in a data block header detection unit 505 for data packets sent from the protocol processing unit 503, and passes header information to an AKE unit 506. The AKE unit 506 generates an encryption decoding key and passes the key to a decoding unit 507. The AKE unit 506 performs authentication and key exchange in accordance with a prescribed operation sequence.

Once authentication and key exchange succeed between the sending side and the receiving side, encryption can be decoded even when encrypted A/V data is received. When authentication and key exchange have not succeeded between the sending side and the receiving side, encryption cannot be decoded when encrypted A/V data is received.

The A/V data decoded by the decoding unit 507 is divided into separate data blocks in a data block generation unit 508, and separated into data packets and TS packets in a demultiplexer unit 509

Separated data packets are detected by a data packet detection unit 510, and then detected in a signal format/property detection unit 511 as an attribute of a video signal represented by the TS packets, e.g., copy control conditions.

Separated TS packets are filtered in a TS packet filtering unit 512, and outputted to the outside via a TS interface 513.

By the way, to get a partial MPEG-TS, a digital broadcasting signal transmitted over the terrestrial digital broadcasting and satellite digital broadcasting in Japan, CATV, the Internet, or a high-speed IP network distribution system is received on a digital broadcasting tuner and a channel is selected. Then, a partial MPEG-TS that makes up a broadcast program is extracted from a full TS transmitted by a broadcasting station. PSI/SI multiplexed on a partial MPEG-TS includes a PAT, PMT, DIT, SIT (see the ARIB standard, STD-B21, for example), and the PMT contains a DTCP descriptor. Also, the DTCP descriptor contains analog copy control information and digital copy control information. For example, when both digital copy control information in the PMT first loop and digital copy control information in the PMT second loop are present in the digital copy control information for a certain program on a certain channel, the digital copy control information in the PMT second loop is preferentially set as the digital copy control information for that program. When only one of digital copy control information in the PMT first loop and digital copy control information in the PMT second loop is present, the digital copy control information that is present is set as the digital copy control information for the program. These definitions are provided in the ARIB standard, TR-B14, Part 4, Chapter "Digital Copy Control", and are exercised for digital broadcasting. However, since the interpretation and concept of copyright changes with times as information disclosure and the Internet develops and becomes commonplace, the definitions shown above are merely an example and other operations are feasible.

When digital copy control information in the PMT second loop is now COG (Copy One Generation, permitting only one-generation copying) in the digital copy control information for a certain program on a certain channel, the encryption unit 417 encrypts a partial MPEG-TS signal. In addition, as an encryption information header, the data block header generation unit 416 adds an encryption mode which indicates COG and AKE information such as encryption key update information (information of equal to or more than one bit) which are sent from the AKE unit 414.

When the digital copy control information in the PMT second loop now indicates CF (Copy Free, copying permitted) in the digital copy control information for a certain program on a certain channel, the encryption unit 417 does not encrypt a partial MPEG-TS signal. In addition, the data block header generation unit 416 adds EMI (encryption mode information) representing the CF mentioned above and AKE information such as seed information (information of equal to or more than one bit) sent from the AKE unit 414 as an encryption information header, and outputs the signal to the protocol processing unit 419. Here, when there is external control not to add an encryption information header, an encryption information header is not added.

It is also possible to include transmission permitting information into external input data or packet data which is inputted being multiplexed on PSI/SI. For example, packet data transmission permitting information is included into a digital copy control descriptor (see ARIB TR-B14, Part 2 and 4, for instance) which is provided in the first or second loop of the PMT for an MPEG-TS. This case entails modification to the equipment of the sending side, such as a broadcast station.

As shown above, whether to perform encryption or not and whether to add an encryption information header or not can be uniquely determined by a condition which is determined from copy control information of a partial TS, external input, and/or internal settings.

The protocol processing unit 419 adds a TCP/IP header to data outputted from the data block packet generation unit 418 using transmission condition parameters from the management/control unit 413. The protocol processing unit 419 also adds a MAC header to a packet using the 802.1Q (VLAN) method to convert the packet into an Ethernet (™) frame, and outputs the frame to the network as a transmitted frame. Here, by setting a high priority (user priority) in TCI (Tag Control Information) in the MAC header, priority for network transmission can be made higher than general data.

Figure 10:
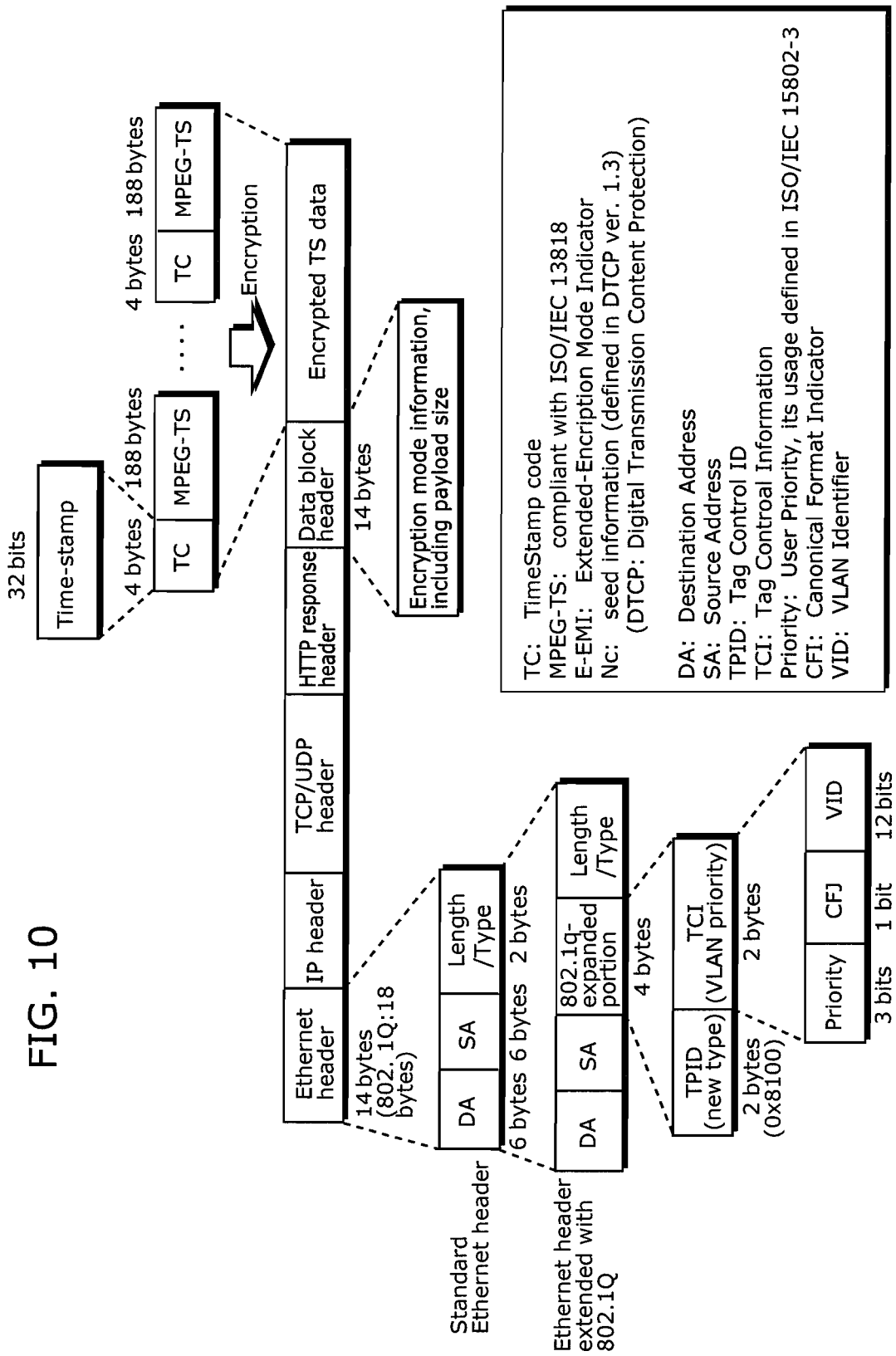
FIG. 10 is a diagram showing an exemplary specification of Ethernet (™) frame structure for an MPEG-TS in the first embodiment of the invention.

FIG. 10 shows an example of an Ethernet (™) frame for a case where an encrypted partial MEPG-TS is transmitted by HTTP/TCP/IP/Ethernet (™). Here, to the partial MPEG-TS packet (188 bytes), a 4-byte timestamp is added as a header. This 4-bytes timestamp is sampled at a 27-MHz clock.

Figure 9:
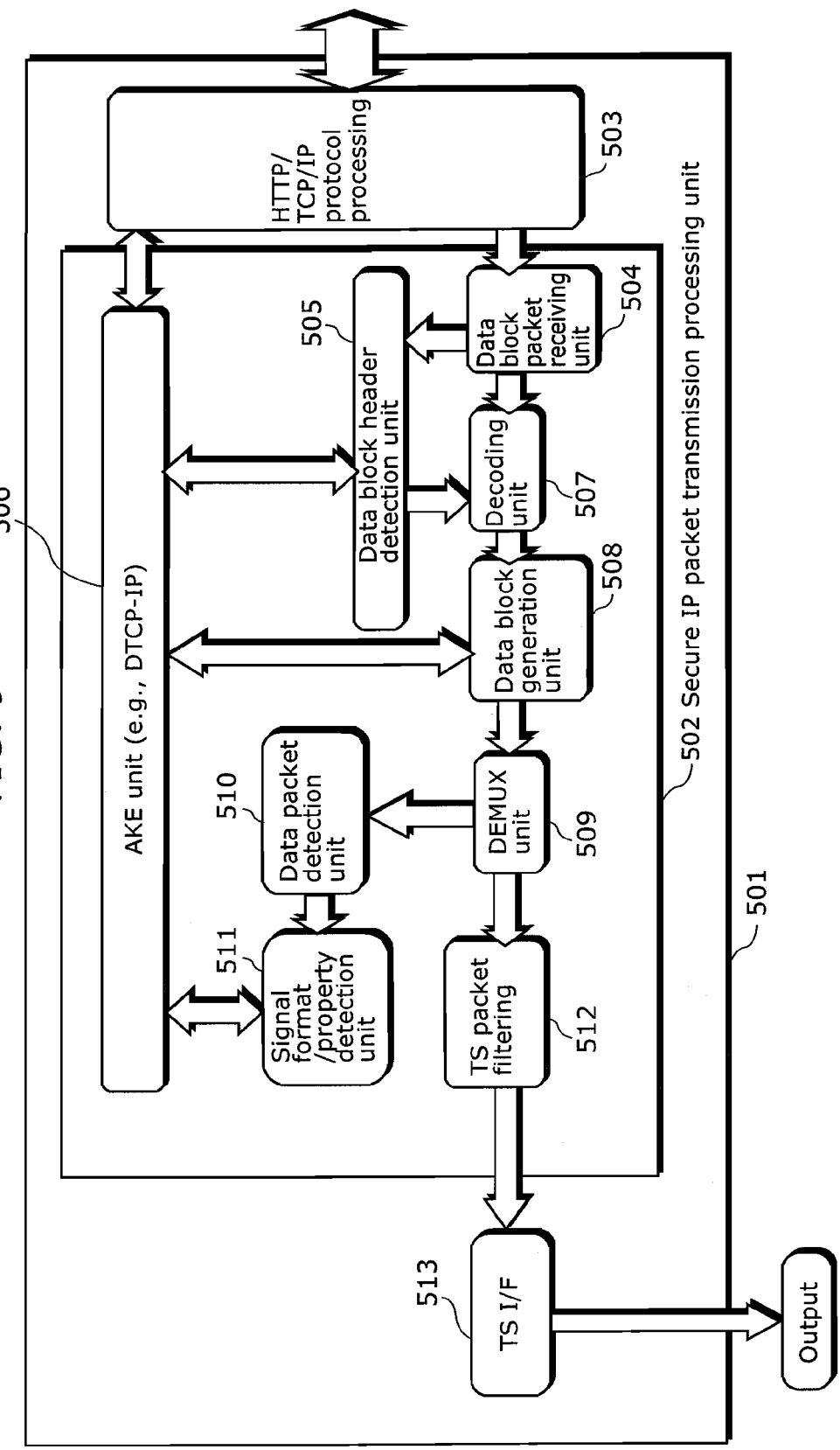
FIG. 9 is a block diagram of a packet receiving unit according to the first embodiment of the invention.
Figure 11:
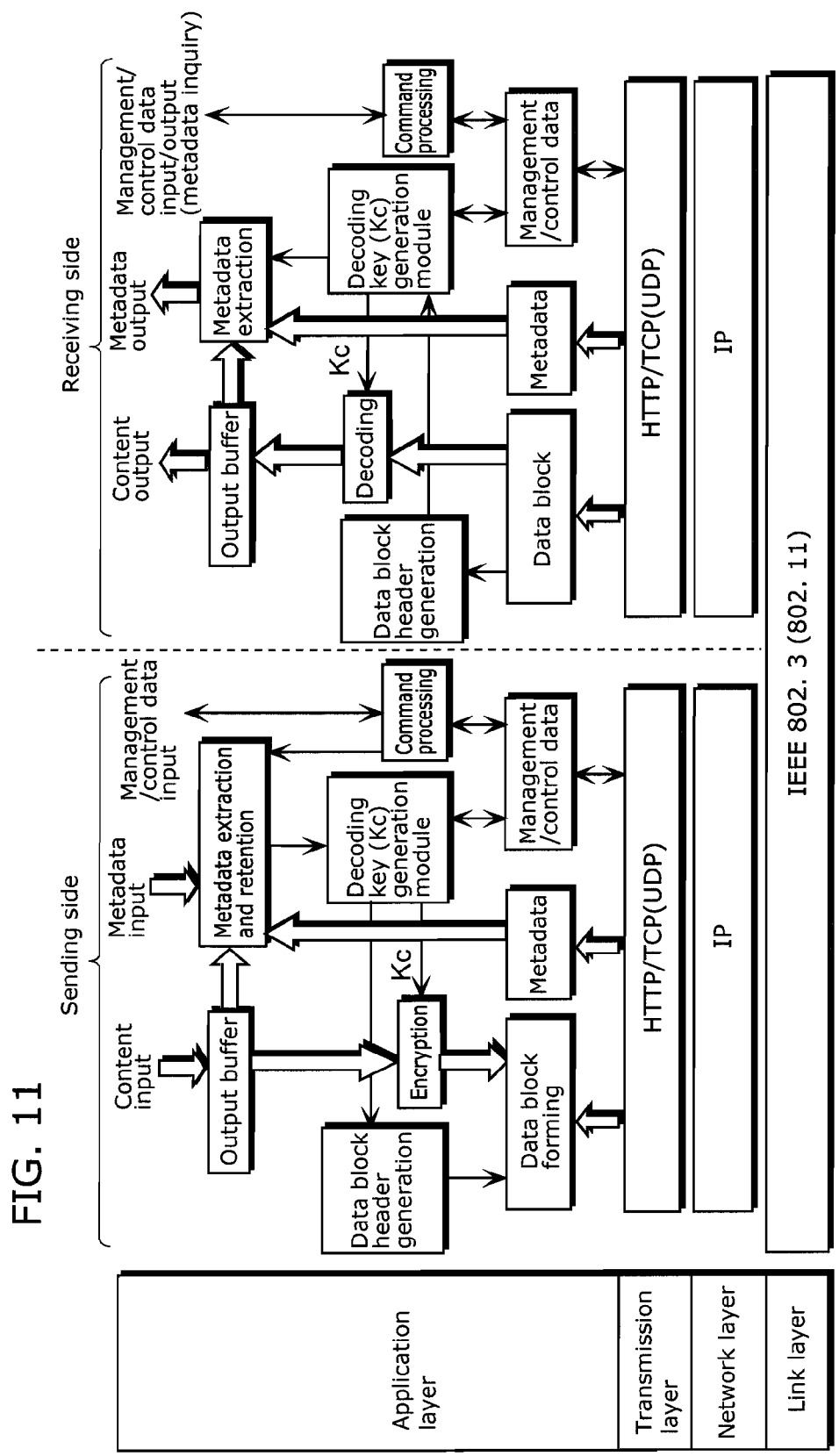
FIG. 11 is a diagram illustrating signal and protocol processing in each layer in the first embodiment of the invention.

FIG. 11 additionally illustrates the operations in FIGS. 8 and 9 using a protocol stack. In FIG. 11, both the sending and receiving sides handle three types of data including contents, metadata, and management/control data. The management/control data is data for performing operational setting, control, and management of devices on the sending and receiving sides. The metadata is data for selecting a content before content transmission or checking the attribute description of the content during the reception of the content.

Figure 12:
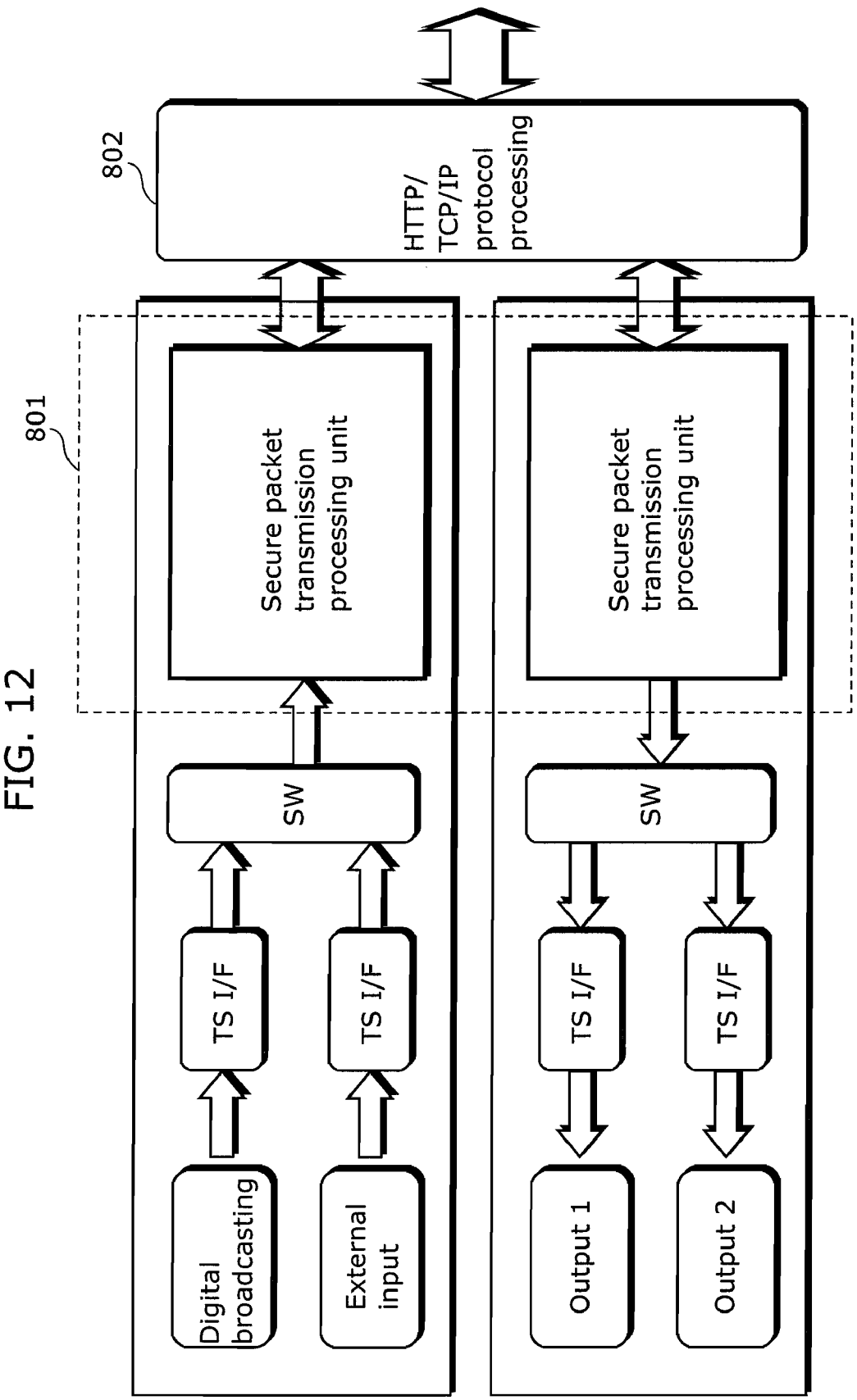
FIG. 12 is a diagram illustrating a packet transmitting/receiving unit according to the first embodiment of the invention.

Also, FIG. 12 is an illustration which summarizes the operations in FIG. 11 into the sending and receiving units.

An MPEG-TS as a content is encrypted with an encryption key. Then, TCP packets are generated with A/V data which is the encrypted MPEG-TS as the payload of the TCP (or UDP) packets. These TCP packets are in turn used as the data payload of IP packets, and IP packets are generated. The IP packets are in turn used as the payload data of MAC frames, and Ethernet (™) MAC frames are generated. For MAC, not only IEEE802.3, which is Ethernet (™), but MAC of IEEE802.11, which is a wireless LAN standard, is also applicable.

The Ethernet™ MAC frames are transmitted over an Ethernet™ from the sending side to the receiving side. On the receiving side, a decoding key is generated in accordance with a predetermined procedure. Then, IP packets are filtered out of the received Ethernet™ MAC frames. Likewise, TCP (or UDP) packets are extracted from the IP packets. Then, A/V data is extracted from the TCP (or UDP) packets, and an MPEG-TS (i.e., the content) is decoded with the decoding key reconstructed from an exchanged key and key change information, and outputted.

As described above, according to the present embodiment, an A/V stream such as a partial MPEG-TS signal can be encrypted and converted into IP packets on a packet transmitting device and transmitted over a network, and can be decoded into the original signal on an IP packet receiving device.

In FIG. 7, by devising a network topology that uses a switching hub, stream transmission and file transfer are allowed to coexist. For example, by expanding the band of the network 305 between the first floor and the second floor from 100 Mbps, which was shown in the Background Art, to 1 Gbps, an encrypted MPEG-TS can be transmitted in real time among the DVD recorders, PCs, and televisions on the first and second floors while performing file transfer in background between the PCs on the first floor and the second floor. For instance, using a commercially available switching hub having eight 100-Mbps ports and one 1-Gbps port, the 1-Gbps port is connected to the network 305 connecting the first floor and the second floor and A/V devices such as televisions are connected to the remaining eight 100-Mbps ports. Since there are eight 100-Mbps ports, even if data to the eight ports are each inputted at a maximum of 100 Mbps and outputted to the 1-Gbps port, the data inputted from the eight ports are all outputted to the 1-Gbps port without being lost inside the switching hub because 100 Mbps×8 channels=800 Mbps, smaller than 1 Gbps. Accordingly, any data occurring on the first floor can be transmitted to the second floor. Furthermore, in the counter direction, any data occurring on the second floor can also be transmitted to the first floor. In such a way, when a switching hub is used, stream transmission and file transfer can be allowed to coexist by devising a network topology.

In FIG. 8, the AKE unit 414 internally has an authentication mode determination unit. A TCP port number for authentication is inputted to the AKE unit 414 as AKE setting information and to the management/control unit 413 as management/control data. Here, the TCP port information for authentication can be given using a mechanism of UPnP-A/V in the form of a URI that specifies an access position for each content or each broadcasting channel, or URI information which is extended with Query. Here, URI information for content is mapped to the main data portion of a URI, and authentication information for the content is mapped to the Query portion. Here, it is possible to make mode settings such that transmission of content does not require authentication when there is no Query portion and transmission of a content requires authentication when there is a Query portion. Examples of a URI and Query can be given in the format shown below, for example.

<service>://<host>:<port>/<path>/<filename>.<ext>?AKEHOST=<host2>:AKEPORT=<port2> where <host>:<port>/<path>/<filename>.<ext> represents the URI and the file name of an A/V content, and <host2> and <port2> in the Query portion following the "?" represent an IP address and a port number for authentication, respectively.

The sending side supplies authentication execution mode information to the receiving side with this URL and Query. The receiving side receives the URI and Query information using a Web browser or a Content Directory Service (CDS) for UPnP-A/V, and an authentication mode determination unit 601 can determine an authentication mode.

In FIG. 8, the following cases are possible, for example, as input source information (e.g., broadcasting, input from an external movie) for A/V data inputted to the management/control unit 413: (Case 1) A case where the A/V data is a content which is received on a broadcasting channel that broadcasts copy-free contents. Examples of such broadcasting channels include VHF and UHF, which are analog broadcasting, and broadcasting channels for BS analog broadcasting, for example.

(Case 2) A case where the A/V data is a content which is received on a broadcasting channel that broadcasts contents which are not copy-free even if temporarily. Examples of such broadcasting channels include pay channels of BS digital broadcasting and pay channels of CATV broadcasting, for example. Copy control information for a broadcasting channel that broadcasts contents which are not copy-free even if for a limited time period switches among Copy Never, Copy One Generation, and Copy Free with an EPN (Encryption Plus Non-Assertion) flag with time in accordance with what is being broadcast.

Here, reception of a broadcasting channel that broadcasts contents which are not copy-free even if temporarily can be controlled to be done when a receiving apparatus or a receiving user has been verified to be an authorized one by the authentication unit with a business that distributes broadcasting. An example of this authentication can be authentication using a security module, such as a BS-Conditional Access Systems (B-CAS) card for Japanese digital satellite broadcasting or a Point of Deployment (POD) card used for CATV broadcasting in the United States.

Also, addition of an encryption information header is controlled in the following manner, for example. To be specific, an encryption information header is not added when a broadcasting channel which broadcasts copy-free contents is received. An encryption information header is added when a broadcasting channel that broadcasts contents which are not copy-free even if for a limited time period is received. Further, an encryption information header is not added when A/V data is a content of a copy-free title reproduced from an accumulation medium. An encryption information header is added when A/V data is a content of a non-copy-free title reproduced from an accumulation medium. When an encryption information header is added on the sending side, a Content-Length which is the length of the transmission data plus the length of the encryption information header is described in an HTTP response header.

By controlling addition of the encryption information header in the above-described manner, CCI (copy control information) for an A/V content which is set by the copyright holder can be preserved and passed also in network transmission. In addition, by sharing the same the rule for controlling the addition of the encryption information header between the sending side and the receiving side, operational compatibility among different device models can be secured.

Figure 13:
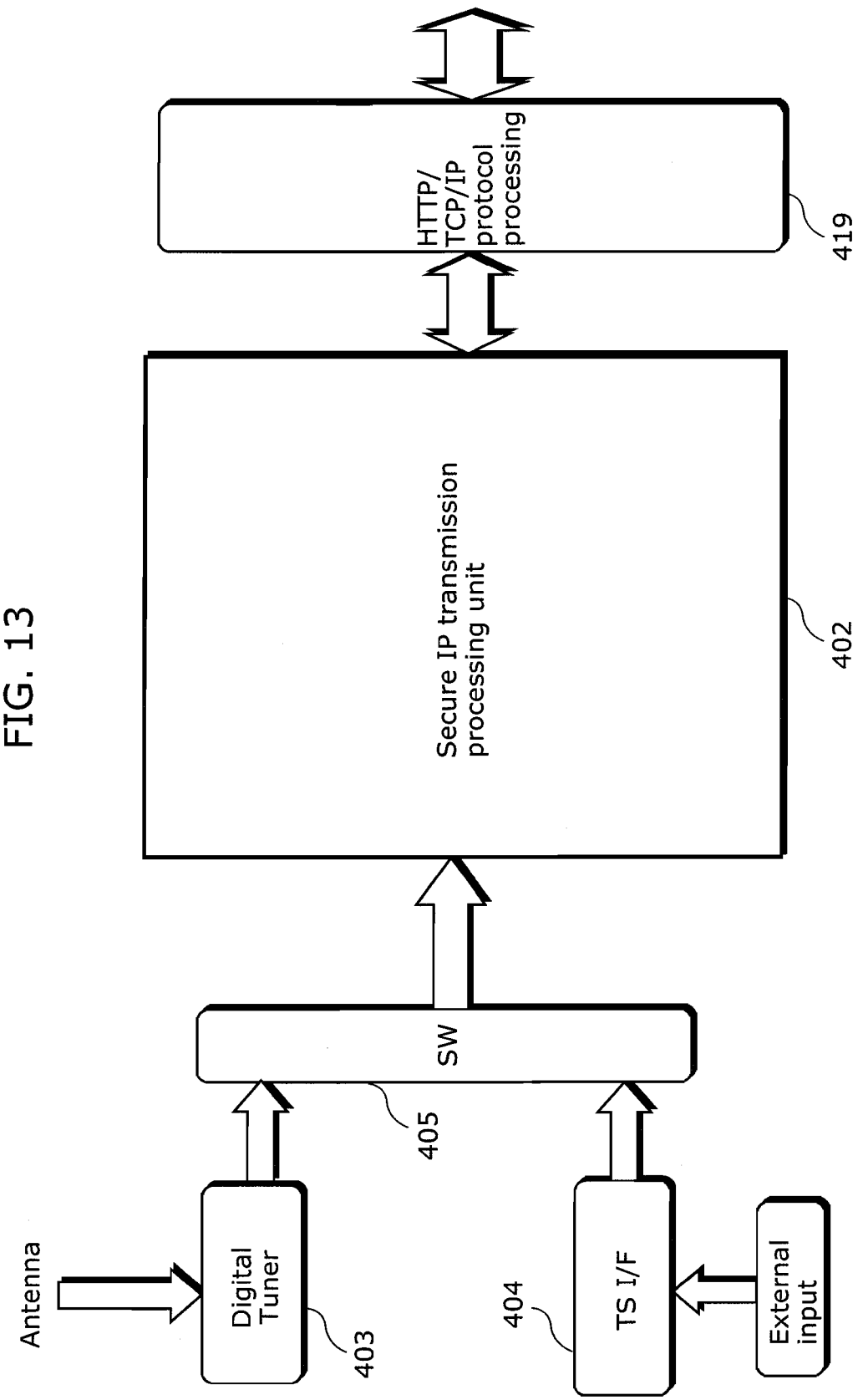
FIG. 13 is a simplified illustration of FIG. 8.

FIG. 13 is a simplified illustration of FIG. 8, which includes the digital tuner 403, TS interface 404, switcher 405, secure IP transmission control unit 402, and transmission protocol processing unit 419 as representative components.

In FIG. 13, an A/V signal inputted from the digital tuner 403 is each an MPEG-TS signal which is obtained by receiving Japan's digital broadcasting (terrestrial digital broadcasting, BS digital broadcasting, and 110-degree CS digital broadcasting) and has copy control of Copy One Generation (COG) (which means copyright protection is implemented). Also, an A/V signal inputted from the TS interface 404 is a copy-free (meaning copyright protection is not implemented) MPEG-TS signal which is captured with a camcorder (movie) that supports HDTV.

It has been described above that a unit program of A/V data on the packet transmitting apparatus uses the first MIME-Type (when a block header is added and encryption is implemented) and the second MIME-Type (when a block header is added and encryption is not implemented). Here, a third MIME-Type (a case where a block header is not added and encryption is not implemented) is further used for a copy-free MPEG-TS signal which is captured with an HDTV-enabled camcorder (movie).

For identification of a content with an MIME-Type, a content can be identified from an MIME-Type inserted in the third field of protocolInfo, which is an attribute of <res> described earlier, or from an MIME-Type inserted in the header of an HTTP response.

When a director (which means the copyright holder) of shooting with an HDTV-enabled camcorder (movie) does not want to set an MPEG-TS signal he/she has captured to copy-free, he/she can assert a copyright in compliance with laws on copyrights so as to set and operate the CCI of the MPEG-TS signal he/she has captured to COG or CN, or can upload the signal to a server as a pay content and charge a fee for the content. In this case, the first MIME-Type (a block header is added and encryption is implemented) can be used, for example.

Note that although the present embodiment was described using the DTCP method as the way of copyright protection, the DRM method can also provide a similar effect as the way of copyright protection aside from the DTCP method.

Second Embodiment

Figure 14:
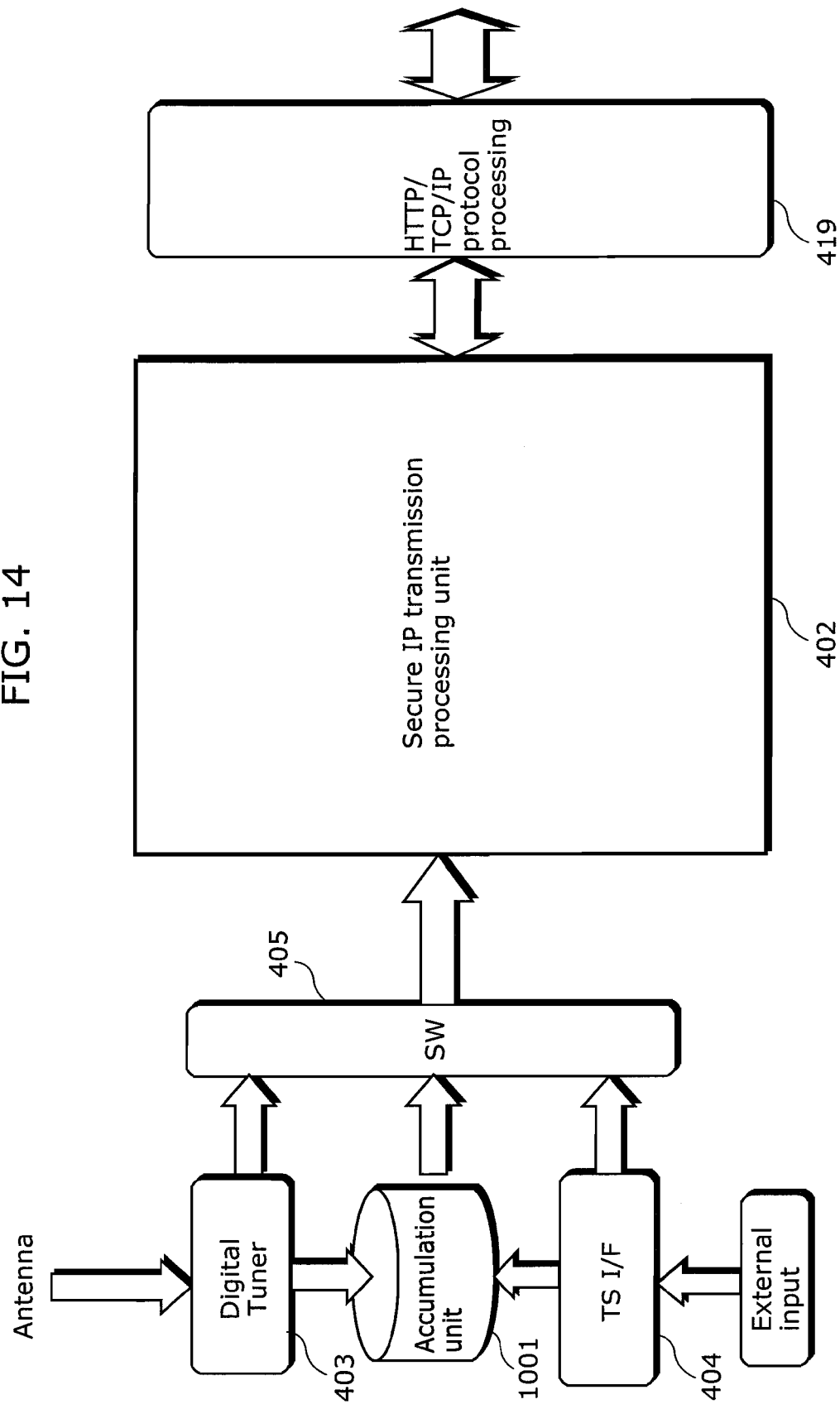
FIG. 14 is a block diagram of the packet transmitting unit according to a second embodiment of the invention.

Next, a second embodiment of the invention will be described. FIG. 14 is a block diagram showing the configuration of the packet transmitting unit according to the present embodiment. As representative components, FIG. 14 includes the digital tuner 403, TS interface 404, switcher 405, secure IP transmission control unit 402, transmission protocol processing unit 419, and an accumulation unit 1001. The configuration of FIG. 14 has the accumulation unit 1001 in addition to the configuration of the packet transmitting unit of the first embodiment shown in FIGS. 8 and 13. In the following, description of the same matters as in the first embodiment is omitted and only different matters will be described.

This packet transmitting unit includes the accumulation unit 1001 which is connected to the digital tuner 403 and the TS interface 404. Here, as the accumulation unit 1001, a hard disk drive (HDD), an optical disk (e.g., a CD and a DVD), or a semiconductor disk (e.g., a SD card and memory), or combination of them can be adopted. In the present embodiment, the packet transmitting unit transmits partial MPEG-TS data and the like accumulated in a hard disk or an optical disk using an HTTP range request from the receiving unit, for example.

This range request is made by selecting the beginning of a range and the end thereof with the distance from the beginning of a file of a partial MPEG-TS accumulated in the accumulation unit 1001, e.g., A and B (A and B are integers equal to or more than 0 satisfying A<B). While free values can be typically selected for A and B for general data, when video data such as an MPEG-TS is to be got as a range, efficient transmission can be performed by paying attention to the GOP or Picture structure of the data. However, the receiving side is unable to know which portion of an accumulated file of the sending side constitutes a GOP and/or which portion represents an I picture. Thus, upon receipt of an HTTP range request from the receiving side, the sending side returns GOPs which are respectively closest to the beginning and the end of the range as an HTTP response. This transmission method is provisionally called an HTTP Alignment Response Method (HTTP A/V Alignment Data Unit Response Method, abbreviated as HAR method). Selection of this transmission mode can be triggered in the following manner, for example.

1) The sending side (the server) and the receiving side (the client) perform negotiation in advance using a mechanism of UPnP-A/V and the like.

2) Indicative information such as a character string for indicating that the HAR method is going to be used is inserted in an HTTP request header in expectation of a response by the HAR method. For instance, har-value=gop is inserted in the HTTP request.

A server not supporting the HAR method does not respond to this indicative information, but a server supporting the HAR method responds to the indicative information to find the beginning of a GOP closest to the beginning of the range as a requested range from the requested data, and sets it as the range beginning in a response. The server also finds the beginning of a GOP that is closest to the end of the range as the requested range from the requested data, and sets it as the range end in the response. Then, the server inserts indicative information such as a character string that indicates the response is one by the HAR method into an HTTP response header. For instance, the server inserts into the HTTP response har-value=gop.

Through these operations, the client can partially get an MPEG-TS inserted in the HTTP response in units of GOPs despite the fact that the client has made a random range request for the data in the server.

When an MPEG-TS is a continuously recorded file, once a response on a GOP basis is received, the position of beginning of the next GOP can be easily calculated from the value of the range end that was received at the immediately preceding time when it is desirable to receive video as sequential frames. For example, the position of beginning of the next GOP is given by adding one byte to the value of the range end that was received at the immediately preceding time.

As stated above, in the second embodiment, when the receiving side makes a data request to the sending side with an HTTP range request, the data in the beginning or end of a transmission data block is made correspond with data in the beginning of a data block unit, such as a GOP, which is managed on the sending side. For example, when the data is MPEG, the units of data blocks managed on the sending side can be specified in units of Pictures, macro-blocks, blocks, TS packets, or time-stamped TS packets in addition to the GOP described in the above example.

When the data blocks are in a hard disk (abbreviated as an HDD) contained in the transmitting apparatus, or an optical disk such as a CD and a DVD (having a number of types such as DVD-R and DVD-RAM), or a semiconductor disk such as a SD memory card, the units of the data blocks can be the units of logical blocks of the recoding format of the HDD (e.g., LBA unit of 512 bytes), CD (e.g., in units of 2 kB) or DVD Accordingly, when data (e.g., a file or a stream) is MPEG, for example, if the range of data which is requested by the receiving side from the sending side with an HTTP range request does not align with a data boundary of GOP units or Picture units, in other words, if data alignment is not achieved, a response with the boundary aligned based on a GOP, a Picture, or a TS packet that is positioned near the data range which is requested as an HTTP response can be returned by way of processing on the server (i.e., the sending side) if the unit for use in the response is determined to be the unit of GOPs or Pictures in advance through negotiation and the like. The receiving side thus can efficiently perform MPEG decoding from received data.

When the server is a Blu-ray disk recorder as an example of an MPEG-TS, operational load on the server can be lessened because a GOP boundary position or an I-picture position can be efficiently recognized using a PLAYLIST file or a CLIP-INFO file to retrieve a GOP or I-picture data. Also, in the case of an MPEG-PS, if the server is a DVD-RAM disk recorder and its recording format is compliant with the DVD-VR standard, the server has a management file which is called an IFO file in the DVD-VR method. Accordingly, by utilizing management information in the IFO file, the server side can efficiently recognize a GOP boundary position or an I-picture position to retrieve GOPs or I-picture data, which thus improves utilization efficiency of the server as well. By utilizing a data management file having a structure similar to that of a PLAYLIST file, a CLIPINFO file, or an IFO file in such a manner, the server can easily employ the HAR method described above.

In this case, the server receives a range request value based on the HAR method from the client, and compares the value with the IFO file provided in the server to determine a GOP block to return. Consequently, an A/V content can be transmitted with DTCP-IP applied thereto.

Also, such methods as described below can be implemented, for example, for decryption when encrypted contents are recorded in the accumulation unit 701 (targeted contents are ones to which encryption according to so-called DRM is applied), and a user retrieves a list of the recorded contents and selects a content the user wants to view (e.g., a movie, concert, drama).

Method 1) The user purchases information for decoding an encrypted content over the Internet or a telephone line, or at a convenience store and the like. The content is valid when 100 titles of movies, concerts, and/or dramas, for example, are already recorded in the accumulation unit 701 at the point when the user purchases the device of interest.

Method 2) The user downloads an encrypted content through the Internet, a CATV, or broadcasting. The user also purchases information for decoding the encrypted content over the Internet or a telephone line, or at a convenience store and the like.

Method 3) The user employs information for decoding an encrypted content that comes with the content when the user purchases the content as a packaged medium.

In a case the packet transmitting unit has a unit for generating I-frame position information from a TS stream, partial MPEG-TS data and the like is sent from the accumulation unit using an HTTP range request. For the HTTP range request and response, a method for efficiently accessing I frames by the HAR method described above will be described. Here, selection of a transmission mode can be triggered in the following manner, for example.

1) The sending side (i.e., the server) and the receiving side (i.e., the client) perform negotiation in advance using a mechanism of UPnP-A/V and the like.

2) Indicative information such as a character string for indicating that the HAR method is going to be used is inserted in an HTTP request header in expectation of a response by the HAR method. For example, har-value=i-picture:1 is inserted into an HTTP request. Here, as an operation for har-value=i-picture: n (n being an integer), the I-frame position information generation unit of the server calculates and generates position information of "i-pictures" within the range of a range request. Based on the position information of i-pictures within the range of range request, the accumulation control unit 701 extracts i-picture data skipping every nth I picture, and sends the data to the client. When the value of n is "+", only i-pictures are extracted from the beginning of the range toward the end thereof and sent to the client skipping every nth i-pictures, that is to say, forward frame skipping reproduction is performed. When the value of n is "−", only i-pictures are extracted from the end of the range toward the beginning thereof and sent to the client skipping every nth i-pictures, that is, reverse frame skipping reproduction is performed.

By expanding "har-value" to "=i-picture: n (n being an integer)", the client can partially get an MPEG-TS inserted into an HTTP response in units of i-pictures despite the fact that the client has made a random range request for data in the server.

When there is information on the position and approximate size of I frames as management information for an MPEG-TS recorded in the HDD of the server, it is also possible to use the information to transmit data including I pictures to the client.

As stated above, by making use of information on I-frame positions in an MPEG file in the server, trick play, such as fast forward, fast rewind, and slow reproduction, can be efficiently realized. Thus, in general, a DRM-enabled A/V content can be transmitted using DTCP-IP.

A/V data can also be transmitted by switching between transmission by HTTP and transmission by RTP. In the case of RTP, if an appropriate start position is specified with the RTCP protocol, the HAR method supporting RTP can be applied there.

By using a picture information file which can be used as a common file among a number of different file formats to handle position information and/or time information of I/P/B pictures in the file as a common picture information file for a system that adopts a different MPEG file system, different file formats can be handled on a common platform.

For position information of MPEG I pictures, P pictures, or B pictures in a file of A/V data, I-picture, P-picture, or B-picture position information that is common among a number of different formats is generated from position information for a number of I pictures, P pictures, or B pictures and time information for the MPEG I pictures, P pictures, or B pictures, which are originally provided even when the A/V data is of a number of different formats. This common I-picture, P-picture, or B-picture position information is used as reference information of position information and time information for MPEG I pictures, P pictures, or B pictures in the A/V data file. This has a great advantage of allowing a remote terminal to directly access a specific picture by means of the common position information or time information for I, P, or B pictures even when an HDD contains MPEG-TS files recorded in different recording formats, for example.

For example, from an HDD or a BD disk in which partial TSs are recorded, a "picture information file" which unifies the continuity of I, P or B pictures and their position information within the file is read out. By referencing the unified picture information file with byte position or time information (i.e., timestamp), a terminal which is remotely located via a network can finely reference individual picture positions even in a different TS recording format.

As described above, trick play, such as slow reproduction and fast reproduction, which is detailed and visually pleasing is realized. The picture information file can be regarded as a filtering function for enabling a remote terminal to view in a common file format a picture position in an MPEG-TS file on a local terminal which is recorded in a different format. In other words, a common picture information file can be generated from an A/V data file which records MPEG-TSs in its own file format and a file of relevant information.

The present embodiment also provides an effect of allowing MPEG I, P, or B pictures to be efficiently accessed even from transmitting and receiving apparatuses that do not implement AKE or encryption processing on A/V.

Also, since a protocol sequence for a range request using the HTTP protocol transmits only an extracted portion of transmission data, a TCP connection might be disconnected each time data transmission terminates. In such a case, even if the original data is continuous on a time base, a set of a plurality of transmission data blocks has been transmitted by repeating the establishment, disconnection, establishment, and disconnection of a TCP connection, and the time base of the data is regarded as discontinuous. In the case of a partial MPEG-TS, if conventional processing complying with the DVB standard or ARIB standards, STD-B21, TR-B14 or 15 is performed, for example, it is necessary to add time-based discontinuity information such as a DIT at the beginning and end of the transmission data. Consequently, when the size of transmission data changes, the Content-Length in the header of an HTTP response increases not only by the addition of an encryption information header but also the addition of time-based discontinuity information from the originally requested value. As the addition of the encryption information header is deleted in the packet receiving unit, it does not have to be handled as a net transmitted content. The present invention does not handle the addition of the encryption information header as a net transmitted content also in the subsequent embodiments because it is deleted in the packet receiving unit.

As a new mechanism for transmitting a partial MPEG-TS by HTTP, the present embodiment adopts an algorithm that does not insert discontinuity information such as a DIT at the beginning or end of an HTTP response unless there is specific indication that the time base is discontinuous. The discontinuity occurrence/continuity information in an MPEG stream is DIT information which is described in the ARIB standard, ARIB-TR-B-14, or Part 2 of ARIB-TR-B14, for example. It is also possible to generate discontinuity occurrence/continuity information with different logical description based on this information. A discontinuity point of a stream refers to, for an MPEG partial TS, for example, a point at which discontinuity of an MPEG-TS stream based on system time occurs, e.g., a point a which PCR becomes discontinuous, or a point at which the discontinuity of continuity_counter in the transport packet header of any one of packets that make up a partial TS occurs.

Here, since the data structure of an MPEG-TS is described in units of GOPs or I pictures in the auxiliary data file, Ranges No. 1, No. 2, and No. 3 can be each in units of GOPs or I pictures of an MPEG-TS file, which can realize efficient data transmission for the general decoding operation (which is employed with a meaning synonymous with a decoding algorithm and sequence) of MPEG.

By utilizing the GOP structure or I-frame position information of an MPEG file in the server as described above, trick play, such as fast forward, fast rewind, and slow reproduction, can be efficiently realized. Thus, in general, a DRM-enabled A/V content can be efficiently transmitted by applying DTCP-IP.

Third Embodiment

Figure 15:
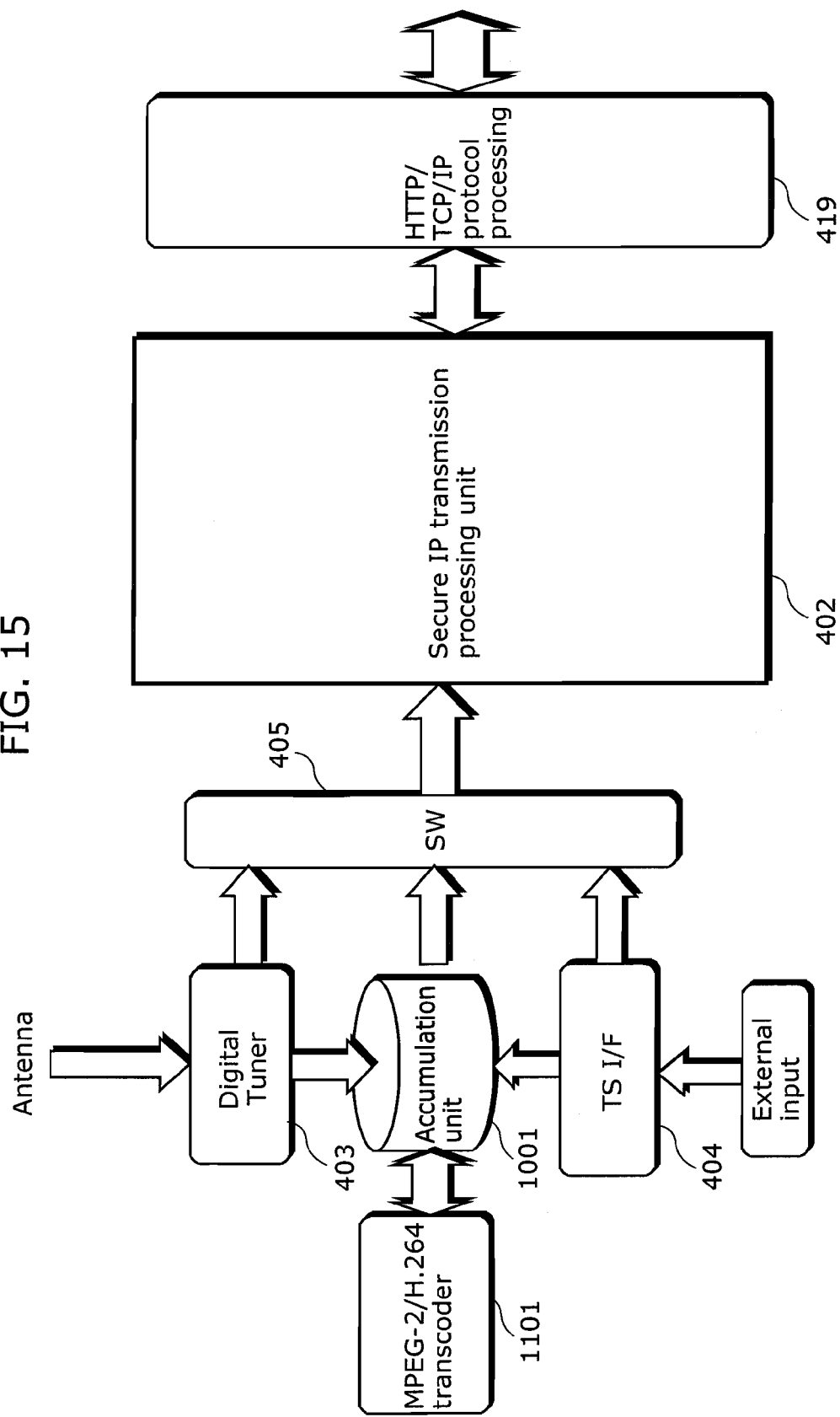
FIG. 15 is a block diagram of the packet transmitting unit according to a third embodiment of the invention.

Next, a third embodiment of the invention will be described. FIG. 15 is a block diagram showing the configuration of the packet transmitting unit according to the present embodiment. This packet transmitting/receiving unit has an MPEG-2/H.264 transcoder 1101 in addition to the configuration of the packet transmitting unit according to the second embodiment shown in FIG. 14. In the following, description of the same matters as in the second embodiment is omitted and only different matters will be described.

This packet transmitting unit newly has the MPEG-2/H.264 transcoder 1101 which is connected with the accumulation unit 1001. The MPEG-2/H.264 transcoder 1101 transcodes a file of an MPEG-2 TS accumulated in the accumulation unit 1001 into H.264 (called H.264/AVC format). As this transcoding can reduce the file size to about half or smaller while maintaining image quality, more files can be accumulated and also an H.264 stream can be transmitted in real time in a narrower band or file transfer at a higher speed is possible.

When an in-home network is build with a wireless LAN (such as 802.11a/b), for example, with MPEG-2, the TS bit rate of HDTV is about 25 Mbps and band is insufficient in the wireless LAN, whereas with H.264, the transmission rate can be reduced to about 8 Mbps and thus in-home wireless transmission of HDTV becomes possible with allowance with this configuration. Also, in the case of SDTV, since the transmission rate can be limited to about 1.5 Mbps, the transmission rate will be only 9 Mbps with six channels, which means MPEG-TSs for six major broadcast stations can be transmitted concurrently between a home server and a client.

A commentary on H.264 is provided in Sakae Okubo, "H.264/AVC Kyoukasho (H.264/AVC Textbook)", published by Impress, for instance.

When H.264 is mapped to MPEG-2 TS packets and operated in the MPEG system, the MPEG-2/H.264 transcoder 1101 handles CCI such that it inherits "a PMT for an MPEG-2 TS" to "a PMT for an H.264 TS" without changing the meaning of a CCI mode in the PMT which contains CCI in the MPEG-2 TS. As a result of transcoding from MPEG-2 to H.264, a program map table (PMT) and a stream PID which are designated by a PAT and a PMT, respectively, change. An SIT and a DIT are rewritten to appropriate values. Through this processing, it is possible to transcode an A/V signal portion from MPEG-2 to H.264 and into a TS of H.264 containing a PAT, PMT, SIT and DIT.

Also, transcoding from an MPEG-2 TS to a PS can be considered in a similar way. When the DVD-VR (Video Recording) specification is used for an MPEG-PS, for example, a TS packet of MPEG-2 can be converted into PES, then into an MPEG-PS. For preservation of CCI, "a PMT for an MPEG-2 TS" is transformed to "CCI in an RDI pack, which contains CCI in the DVD-VR standard", for example, without changing the meaning of a CCI mode in the PMT which includes CCI in an MPEG-2 TS. For digital copy control, the meaning of CCI for digital copy control in a PMT is preserved into CCI for digital copy control of an RDI pack. For analog copy control, the meaning of CCI for digital analog copy control in a PMT is preserved into CCI for analog copy control in an RDI pack. Through this processing, an A/V signal portion can be transcoded from a TS of MPEG-2 to a PS along with CCI information (i.e., the meaning of CCI).

By using an MPEG-PS, when an in-home network is build with a wireless LAN (e.g., 802.11a/b), for example, since the transmission rate can be limited to about 1.5 to 10.8 Mbps for an PS of MPEG-2, video can be wirelessly transmitted in a house with more allowance than with an MPEG-TS. Also, when the transmission rate is reduced to about 1.5 Mbps, the transmission rate will be only 9 Mbps for six channels, for example, which enables MPEG-PSs for six major broadcast stations to be concurrently transmitted between a home server and a client.

Fourth Embodiment

Figure 16:
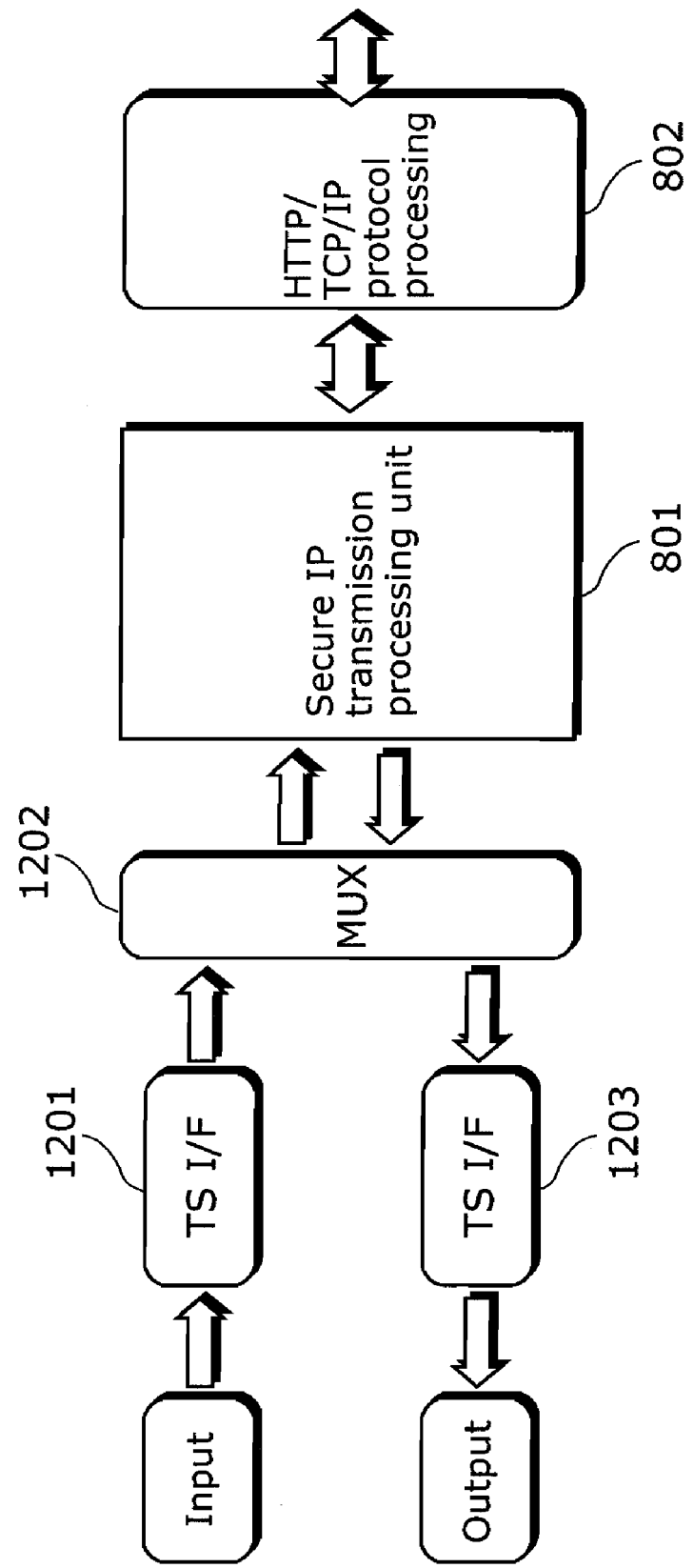
FIG. 16 is a block diagram of the packet transmitting/receiving unit according to a fourth embodiment of the invention.

A fourth embodiment of the invention will be described next. The configuration of the packet transmitting/receiving unit according to the present embodiment is shown in FIG. 16, which is a configuration combining the transmitting unit of FIG. 8 and a receiving unit of FIG. 9 which were described in the first embodiment into a transmitting/receiving unit. As representative components, FIG. 16 includes a TS input interface unit 1201, a TS-MUX unit 1202, a TS output interface 1203, a secure IP transmission control unit 801, and a transmission protocol processing unit 802. In the following, description of the same matters as in the first embodiment is omitted and only different matters will be described.

In FIG. 16, a TS signal inputted to the TS input interface unit 1201 is inputted to the secure IP transmission control unit 801 through the TS-MUX unit, and transmitted to the receiving unit from the transmission protocol processing unit 802. Also, a signal received by the transmission protocol processing unit 802 is inputted to the secure IP transmission control unit 801, and outputted to the TS output interface unit 1203 through the TS-MUX unit.

As described above, the configuration of FIG. 16 enables bidirectional communication.

When bi-directional communication is being performed using a HDTV-enabled camcorder (movie) and the shooting director (meaning the copyright holder) wants to encrypt the MPEG-TS signal he/she captured even if it is copy-free, the director can set the CCI of the MPEG-TS signal he/she captured to CF/EPN (Copy Free, Encryption plus non-assertion) mode and use the signal for Peer-to-Peer (PtoP) communication and the like. In this case, the first MIME-Type (a block header is added and also encryption is implemented) can be used, for example.

Fifth Embodiment

Next, a fifth embodiment of the invention will be described. The configuration of the packet transmitting/receiving unit of the present embodiment is shown in FIG. 17, which is similar to the configuration of FIG. 16 described in the fourth embodiment but is significantly different in that it has two input channels and two output channels.

Figure 17:
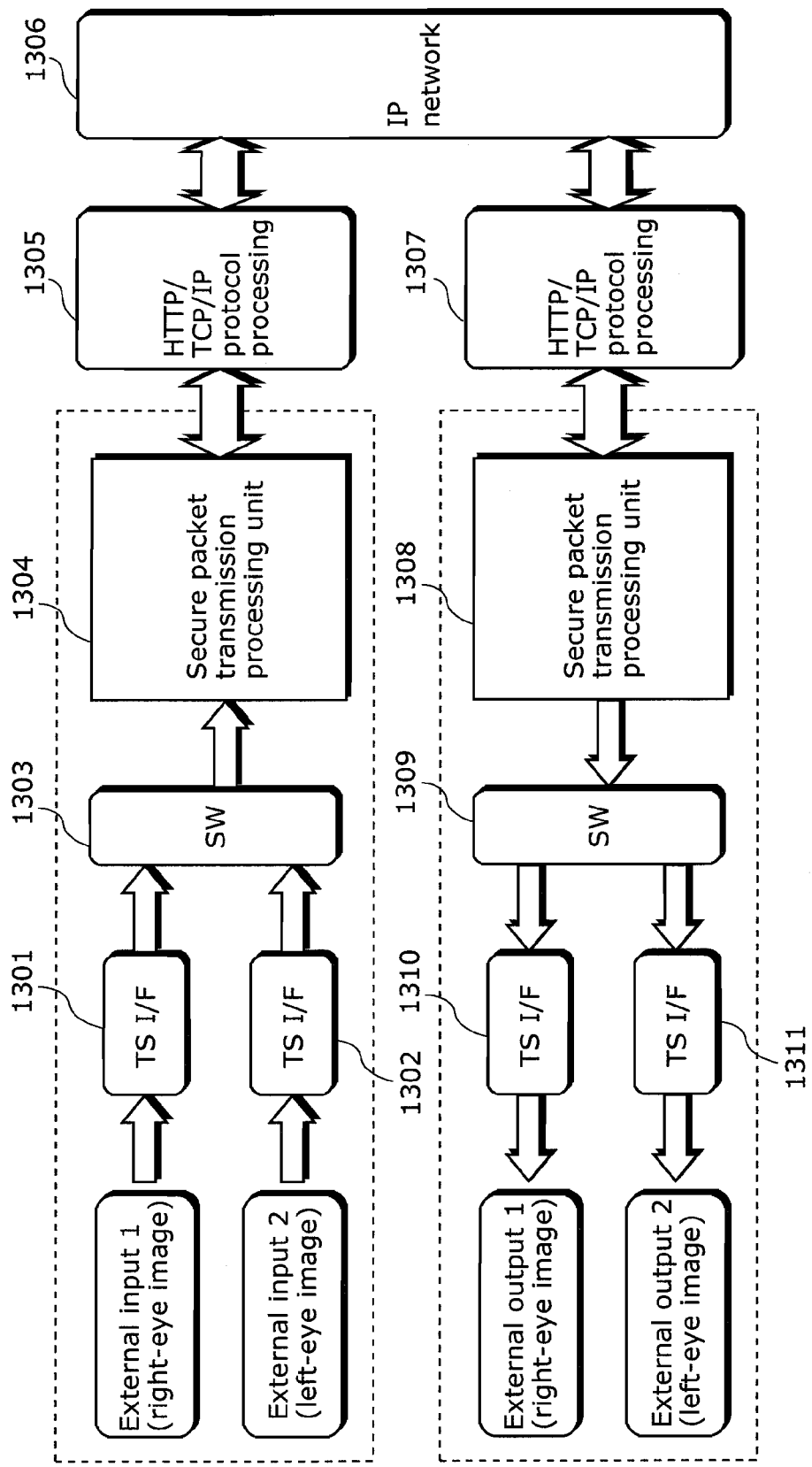
FIG. 17 is a block diagram of the packet transmitting/receiving unit according to a fifth embodiment of the invention.

As representative components, FIG. 17 includes an IP network 1306, a TS input interface 1301 for external input 1, a TS input interface unit 1302 for external input 2, a TS-MUX unit 1303, a secure packet transmission processing unit 1304, a transmission protocol processing unit 1305, a reception protocol processing unit 1307, a secure packet reception processing unit 1308, a TS-DEMUX unit 1309, a TS output interface unit 1310 for external input 1, and a TS output interface unit 1311 for external output 2. Thus, in the following, description of the same matters as in the fourth embodiment is omitted and only different matters will be described.

For the purpose of transmitting a stereoscopic image, a left-eye image and a right-eye image are inputted to the external input 1 and the external input 2, respectively, in FIG. 17. Here, the left-eye image and right-eye image to be inputted are subjected to video frame synchronization or video field synchronization between the left image and the right image at the time of encoding according to MPEG-2 or H.264. In the case of MPEG-2, video synchronization of a 2-channel image is achieved based on I-Pictures. In the case of H.264/AVC, synchronization of a 2-channel image based on IDR-Pictures facilitates signal processing such as video synchronization processing, which thus can reduce the cost of the apparatus. The IDR is an abbreviation of Instantaneous Decoding Refresh, and in H.264, the beginning of a sequence (a moving picture as a collection of pictures) is an IDR picture.

In addition, when encoding a 3D (stereoscopic) image using MPEG-2 or H.264, since a left-eye image and a right-eye image typically resemble each other, the bit rate of the left-eye image can be made small by encoding the left-eye image with reference to the right-eye image. Consequently, in this case, the total bit rate can be limited to a bit rate about 1.5 times the bit rate of the right-eye image.

Sixth Embodiment

A sixth embodiment of the invention will be described. The configuration of the packet transmitting unit according to the present embodiment is shown in FIG. 18, which is similar to the configuration described in the second embodiment in that the TS external input is an H.265 encoder.

Figure 18:
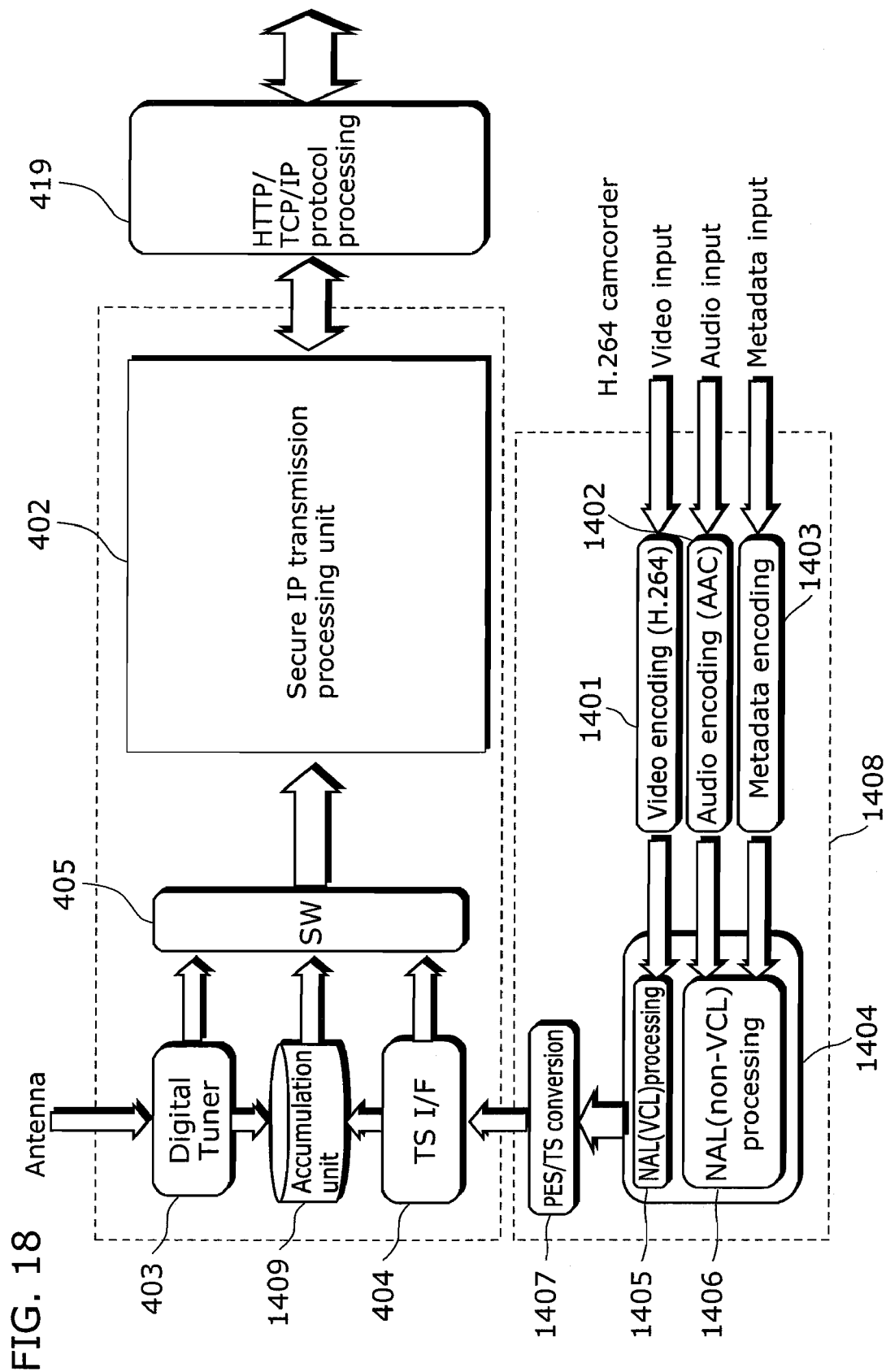
FIG. 18 is a block diagram of the packet transmitting/receiving unit according to a sixth embodiment of the invention.

As representative components, FIG. 18 includes the digital tuner 403, TS input interface unit 404 for external input, TS-MUX unit 405, secure packet transmission processing unit 402, transmission protocol processing unit 419, an H.264 processing unit 1408, and an accumulation unit 1409.

The H.264 processing unit 1408 includes a video encoding (H.264) module 1401, an audio encoding module 1402, a metadata encoding module 1403, an NAL unit processing unit 1404 which includes a Video Coding Layer (VCL)-Network Abstraction Layer (NAL) unit processing unit 1405 and a non-VCL NAL unit processing unit 1406, and a PES/TS conversion unit 1407 for PES/TS conversion of an MPEG-PES output from the NAL unit processing unit 1604.

In the following, description of the same matters as in the already described embodiments is omitted and only different matters will be described.

Figure 19:
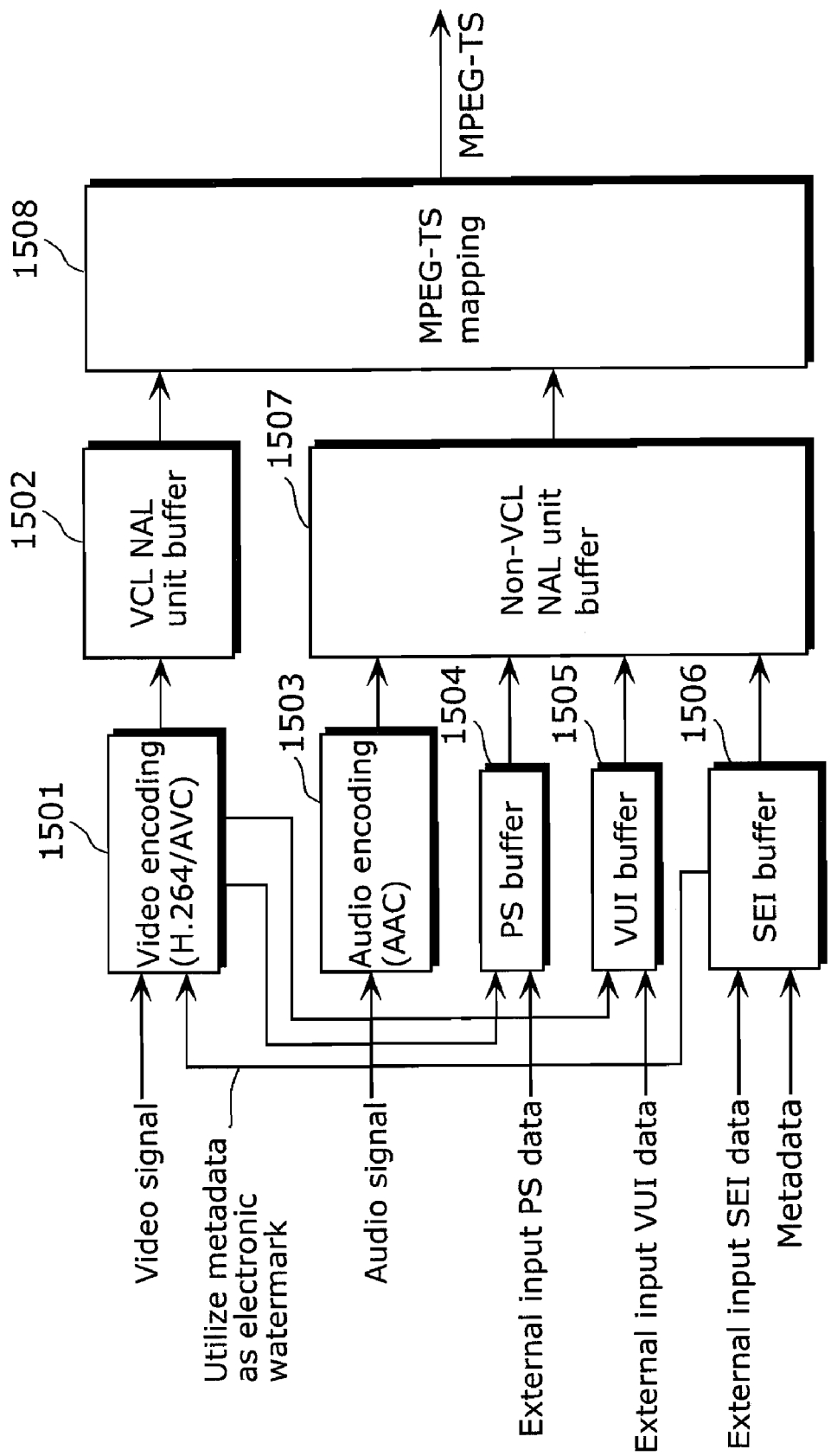
FIG. 19 is a more detailed illustration of an H.264 processing unit according to the sixth embodiment of the invention.

FIG. 19 is a more detailed illustration of the configuration of the H.264 processing unit 1408 of FIG. 18 by explicitly showing a plurality of buffers for temporally maintaining data.

As representative components, FIG. 19 includes a video encoding unit 1501, a VCL-NAL unit buffer 1502, an audio encoding unit 1503, a PS (Parameter Set) buffer 1504, a VUI (Video Usability Information) buffer (1505), an SEI (Supplemental Enhancement Information) buffer 1506, a non-VCL-NAL unit buffer 1507, an MPEG-TS mapping processing unit 1508, and so forth.

To the SEI buffer 1506, metadata can be inputted. For H.264/AVC, metadata can be stored in User Data Unregistered SEI of SEI. Also, for MPEG-2, metadata can be stored in a User Data area in the Picture Header of an Elementary Stream (ES), in a Private Stream of a Program Stream (PS), or in a Private packet of a Transport Stream (TS) by designating a PID.

As listed in FIG. 20, types of metadata include general metadata, metadata acquired from SI (Service Information or program arrangement information) for broadcasting upon receiving digital broadcasting, metadata such as EPG information provided by EPG providers, metadata such as EPG acquired from the Internet, or metadata associated with an A/V content (e.g., a clip) that is taken with a movie by a person or a shooting crew. In the case of shooting with a movie, metadata can be date/time, location, shooting person, the genre of the filmed event, the name of the filmed event, and the like, for example.

As to location, though measurement used to be difficult, it is now possible to calculate a more correct position of even a location outside the reach of GPS radio wave by combination of GPS and a 3D gyroscopic sensor, as in the application to car navigation systems. Also, measurement data for a location can be linked with digitized map data and represented as an address. In addition to an address, various metadata can also be directly inputted from a touch panel and the like.

By making use of such metadata, it is possible to efficiently utilize contents, such as to search for a desired content from among many A/V contents, to classify contents into libraries, or to automatically display A/V contents.

At present, such an environment as follows is being developed and further diversification and distribution of metadata in future is anticipated.

For example, a host of television blog sites that provide metadata composed by viewers have been set up on the Internet (see www.tvblog.jp/, for instance). In addition, services have been started that undertake the collection, processing, and distribution of metadata that occurs at phases relating to broadcasting, such as program planning, recording, editing, scheduling, broadcasting, and archiving (or saving), not to mention existing program information relevant to public relations (see www.plat-ease.co.jp/metadata.htm). Also, a metadata scheme that can help smooth handling of content copyright has been defined by the Ministry of Internal Affairs and Communications (see, for instance, www.soumu.go.jp/s-news/2003/030520_4.htm, www.soume.go.jp/s-news/2003/pdf/030520_4_01.pdf).

Now, in FIG. 18, when a music program is received through digital broadcasting, it is not necessary to find the start of a certain tune when the music program is transmitted live to another room. However, when the music program is received on digital broadcasting and once accumulated in the accumulation unit 1409 for subsequent viewing, there can be a user's demand to easily access a desired tune from among a plurality of tunes which were broadcast in the program. However, when the music program is received through digital broadcasting, though the title of the program and the titles of some tunes can be acquired from EPG information (e.g., an EIT or Event Information Table) in SI, information on the airtime of each tune and the like is not available. Consequently, there is a problem of the user being unable to easily access a desired tune when reproducing a tune from the accumulation unit.

Thus, for the solution of the problem, the management/control unit in the secure packet transmission processing unit 402 accesses a tune information server on the Internet from the router in the house shown in FIG. 7 via the protocol processing unit 419 to acquire information on tunes in the music program (e.g., title, artist's name, album title, genre, performance time, airtime, lyricist, composer, accompanist, and description of tunes). Then, the management/control unit creates a tune position table which associates the acquired tune information for the music program with a plurality of tunes in the music program which are recorded in the accumulation unit 1409 by way of time range information (or byte range information) for that music program (a file in the accumulation unit), and records the table in a directory for storing tune position tables in the accumulation unit. Accordingly, when the user performs browsing or search through a UPnP-A/V Service), the user is allowed to instantly access a desired tune with an HTTP time range (or byte range) designation by using the tune position table for each tune in the music program and for <res> of the file with the title of the music program. Also, for access to a tune by HTTP, when the user designates a tune title with a Common Gateway Interface (CGI) parameter, for example, the server side sets up an application for designating the airtime of that tune in the broadcast program from the title of the tune to realize access to the tune.

Also, when information on the tunes in the music program cannot be acquired from the Internet, tune information for the music program can be acquired by inquiring of waveform data for a tune (e.g., the high point of the tune) from a server for a tune title analysis service and the like on the Internet.

This method can further extended beyond music programs. For instance, when a broadcast program such as a movie, drama, variety show, sport and news is recorded in the accumulation unit, the user is allowed to instantly access a desired scene in the movie by acquiring metadata relating to the movie, e.g., metadata such as scene information (such as a must-see scene or a popular scene) from the Internet or a service for data broadcasting and associating the metadata with the file of the movie recorded in an accumulation medium. Such metadata can also be transmitted through data broadcasting in addition to the Internet.

Seventh Embodiment

A seventh embodiment of the invention will be described. The configuration of the packet transmitting/receiving unit according to the present embodiment is shown in FIG. 21. FIG. 21 is similar to the configuration shown in FIG. 16 which was described in the fourth embodiment. As representative components, FIG. 21 includes an input unit 1701 for A/V signals and/or metadata, an HD (High Definition) encoding unit 1702, a TS-MUX/DEMUX unit 1703, a first accumulation unit 1704, an HD/low definition conversion unit 1705, a secure packet transmission/reception processing unit 1706, a transmission protocol processing unit 1707, an IP network 1708, a transmission protocol processing unit 1709, a secure packet transmission/reception processing unit 1710, a TS-MUX/DEMUX unit 1711, a second accumulation unit 1712, an EDL input unit 1713, an HD output unit 1714, and so forth. In the following, description of the same matters as in the first embodiment is omitted and only different matters will be described.

In FIG. 21, an HD content in the MPEG-TS format which is taken with an HD movie and metadata of the content (e.g., the metadata listed in FIG. 20) are inputted from the input unit 1701, and accumulated in an accumulation unit 1 via the TS-MUX/DEMUX unit. The HD/low definition conversion unit 1705 converts the HD content accumulated in the first accumulation unit into a content of a low definition (e.g., QVGA size with 320 horizontal pixels and 240 vertical pixels) and a low bit rate.

The HD content in MPEG-TS format taken with an HD movie is recorded in a home server. Then, when the content is to be remotely edited via a network from a PC in another room or a portable terminal, processing load on devices and network load will be too large to send the HD content to the PC or the portable terminal.

Thus, as processing on the sending side, an A/V signal and metadata are first inputted and subjected to HD encoding (and low-definition encoding at the same time) and converted to TS packets. Then, the TS packets are accumulated in the first accumulation unit 1704 and the accumulated low-definition content is transmitted to the receiving side.

As processing on the receiving side, an editing list (EDL) is first created and the EDL is transmitted to the sending side. The sending side then transmits an HD content which is edited based on the received EDL to the receiving side. By deleting unnecessary images, the amount of data to be transmitted to the receiving side can be reduced. Here, the transmission protocol is not limited to TCP/IP and may be a general digital interface. The content may also be locally edited on the sending side.

Next, using FIG. 22, a more specific embodiment will be described. A content recorded with an HD movie 1801 is edited and an EDL is created on a portable terminal 1802. The portable terminal 1802 passes the EDL to the HD movie. The HD movie passes the captured HD content and the EDL to a DVD recorder 1803 which contains an HDD. In response to a direction from a remote control 1805, a television receiver 1804 calls the content in the movie 1801 or the DVD recorder 1803. In this case, captured data excluding unnecessary portions can be viewed by using the EDL created on the portable terminal 1802, in addition to title selection. In addition, the DVD recorder 1803 can reduce the size of the file by editing the captured data in accordance with the EDL.

Also in FIG. 22, when a content present in the DVD recorder in the living room is viewed on the television 1808 in the bed room in response to the remote control 1809 via the DVD recorder 1807 in the bed room, the television in the bed room selects the content which is present on the DVD recorder in the living room. Furthermore, the EDL for the selected content is acquired and the captured data is remotely viewed in accordance with the EDL. An HD content edited based on the EDL is also transmitted to the DVD recorder of the receiving side, namely, the DVD recorder in the bed room. By deleting unnecessary images in this way, the amount of data to be transmitted to the receiving side can be reduced.

Note that while the present embodiment uses HTTP, RTP may be used instead of HTTP. In the case of RTP, the receiving side may designate by RTCP a portion of an MPEG file for transmission. This case has an advantage of calculation of a transmission size not being complex as with HTTP.

In addition, although MPEG-TS was used as an example of video signal processing, this is not limitation and the applicable range of inputted data for use in the present invention include any stream pertaining to video and audio, including MPEG-TS streams such as MPEG1/2/4 (ISO/IEC 13818), uncompressed SD-format signal defined in SMPTE314M (DV-based) and SMPTE259M standards, uncompressed HD format defined in SMPTE292M standard, a transmission stream format for MPEG-TSs of DV or digital broadcasting according to IEEE1394 defined in IEC61883 standard, MPEG-TS format based on DVB-ASI defined in DVB standard A010, and streams standardized by MPEG-PES, MPEG-ES, MPEG4, ISO/IEC, H.264, and so forth. The data rate of video and audio is not limited to CBR (constant bit rate). Furthermore, in addition to video and audio, general real-time data or any data that is preferentially transmitted and received should not be excluded from the present invention.

Also, in the above-described embodiment, assuming N is an integer equal to or more than 2, the packet transmitting/receiving apparatus may use N ports for UDP or TCP to transmit N programs composed of A/V data by assigning the programs to the N ports respectively. In this situation, each of the N programs assigned to the respective N ports represents a broadcasting receiving tuner or an accumulation media device included in the source in the container format of a UPnP part, also represents a broadcasting receiving channel or an accumulated program in the item format of the UPnP part, represents the location at which each item (which becomes res as a resource) is present as a URI, and represents a transmission protocol or attribute information in res expression using ProtocolInfo of UPnP, which can realize a detailed transmission system, such as simultaneous transmission of a number of programs to a number of clients.

Also, in the case of broadcasting reception, when there are a plurality of transmission streams from the source to the sink for N programs (res) which are assigned to N ports respectively on the sending side, by representing each of the streams in property format of UPnP and by including, as an attribute of the property of a specific transmission stream, any one of: the container type of a tuner; a tuner ID for each container type of the tuner; a channel ID selected on the tuner; availability information on sharing or takeover of a transmission stream with other client; a TCP or RTP port number used by the transport layer in which the stream is transmitted; a connectionID of a UPnP-A/V unit which is set by a Connection Manager of the UPnP-A/V unit of the sink for the Connection Manager of the source in relation to logical connection for an item; and a connection ID for UPnP-A/V which is set by the Connection Manager of the UPnP-A/V unit of the source for the Connection Manager of the sink in relation to logical connection for an item, the receiving side (or client or sink) can judge whether or not there is free space in a transmission stream and which channel on which tuner is selected by referencing the property and the attribute thereof of the transmission stream when the receiving side selects a channel on a tuner of the sending side (server or source).

For example, as the structure of a UPnP-A/V container for broadcasting reception, the containers of a tuner are placed under <root>. As container types, a tuner container is assigned to each broadcasting system, such as terrestrial digital, BS digital, and 110-degree wideband CS digital. In this case, channels of each broadcasting system are assigned as items under each tuner container. Using serch or brows command for a UPnP CDS, the receiving side can recognize tuner containers and channel items in those tuner containers of the sending side. An item as a channel has associated information which is transmitted by a broadcasting station.

Similarly, in the case of reproducing an accumulated content, when there are a plurality of transmission streams from the source to the sink for N programs which are assigned to N ports respectively on the sending side, by representing in property format of UPnP and by including, as an attribute of the property of a specific transmission stream, any one of: the container type of an accumulation media device; an accumulation media device ID for each container type of the accumulation media device; a program ID selected on the accumulation media device; availability information including sharing of a transmission stream; a TCP or RTP port number used by the transport layer in which the stream is transmitted; a connectionID of a UPnP-A/V unit which is set by a Connection Manager of a UPnP-A/V unit on the sink for the Connection Manager of the source in relation to logical connection for an item; and a connection ID of the UPnP-A/V unit which is set by the Connection Manager of the UPnP-A/V unit of the source for the Connection Manager of the sink in relation of logical connection for an item, the sink can judge whether there is free space in a transmission stream or not and which program in which accumulation media device is selected and the like, by referencing the property and the attribute thereof of the transmission stream when the sink selects a program in an accumulation media device of the source.

For example, as the structure of a UPnP-A/V container when the accumulation or recording device is a hard disk drive (HDD), DVD-RAM drive, or BD drive, each container is placed under <root>. As container types, a container is assigned to each device, such as a HDD, DVD-RAM drive, and BD drive. In this case, an accumulated or recorded content is assigned as an item under each of the containers by program, for example. This enables the receiving side to recognize accumulation or recording device containers of the sending side as well as accumulated or recorded contents in those accumulation or recording device containers as items and by program, for example, using a search or a browse command for a UPnP CDS. Accumulated or recorded items have associated information which is given at the time of recording.

Also, when the client receives and accumulates an item belonging to a broadcasting container of a transmitting server, the client utilizes an attribute of the tuner container for each broadcasting system (an attribute that identifies a broadcasting system, such as terrestrial digital, BS digital, 110-degree wideband CS digital) to generate a property for each broadcasting system, and accumulates or records the property in an accumulating or recording device to save it as the property of the generated item. As a result, even when the containers of the accumulating or recording device are not by broadcasting system, it is possible to identify from which broadcasting system a content has been broadcast by referencing the property of the item reproduced from an accumulating or recording device.

Consequently, either in the case of broadcasting reception or reproduction of an accumulated content, a client that makes a new server connection can understand the utilization of the server, and a content can be selected and transmitted more efficiently.

By logically associating a UPnP-A/V unit with a transport unit that uses HTTP or RTP which employs TCP or UDP by way of a logical pair of "a TCP or UDP port number used by a transport layer in which a stream is transmitted" and "a connectionID of the UPnP-A/V unit which is set by a Connection Manager of a UPnP-A/V unit of the sink for the Connection Manager of the source in relation to logical connection for an item, or a connection ID of the UPnP-A/V unit which is set by the Connection Manager of the UPnP-A/V unit of the source for the Connection Manager of the sink in relation to logical connection for an item", a UPnP-A/V layer that uses a CDS or Connection Manager Service (CMS) can be logically and one-to-one associated with a transport layer that handles HTTP/TCP/IP. Thus, it is possible to more easily realize transmission control, such as establishment of a connection, selection of content, transmission of a content, disconnection of a connection, and management of an existing connection. In addition, by describing the connection ID of the UPnP-A/V unit in an extended field of the message header of an HTTP request message or in an extended field of the message header of an HTTP response message, a transmission control unit based on the HTTP protocol can be logically and one-to-one associated with the UPnP-A/V unit.

The present invention transmits a content acquired by receiving terrestrial digital broadcasting and the like and selecting a program or a channel, or a content recorded on an HD or recorded with a movie to a television or a personal computer in another room over an IP network in the house and enables remote viewing of the content. In addition, the present invention records the content described above in an HDD or a DVD disk, and enables the content to be viewed remotely from another room via an IP network while realizing the title selection and/or trick play of the recorded content.

The invention claimed is:

1. A packet transmitting apparatus, comprising:
   a reception processor operable to receive a plurality of broadcasting channels, each of the plurality of broadcasting channels having specific program information, and operable to acquire an input stream of a specific broadcasting channel of the plurality of received broadcasting channels;
   a program information acquisition unit operable to extract first program information from the acquired input stream, and operable to acquire second program information relating to a program on the specific broadcasting channel, the second program information being acquired from one of (i) a reception signal of a preset broadcasting channel that is different from the specific broadcasting channel, and (ii) an input signal received via a communication network;
   a program information recomposition unit operable to recompose new program information that includes attribute information, the new program information being recomposed by selecting one of the first program information and the second program information, or by combining both the first program information and the second program information, the attribute information indicating whether the new program information is recomposed by selecting the first program information, selecting the second program information, or by combining the first program information and the second program information;
   a filtering unit operable to perform filtering on the acquired input stream using the recomposed new program information; and
   a transmission unit operable to form a new output stream that contains the filtered input stream, operable to packetize the formed new output stream, and operable to transmit the packetized output stream to the outside.

2. The packet transmitting apparatus according to claim 1, comprising:
   a signal format/property detection unit operable to detect, from the acquired input stream, data format information indicating a data format of content data contained in the acquired input stream or attribute information indicating an attribute of the content data contained in the acquired input stream;
   an encapsulation unit operable to encapsulate the detected data format information or the detected attribute information into transport packets;
   a descriptor insertion unit operable to generate a descriptor relating to the content data contained in the acquired input stream, and operable to insert the descriptor into the acquired input stream;
   a partial transport stream generation unit operable to generate a partial transport stream by multiplexing the encapsulated transport packets with transport packets of the acquired input stream inserted along with the descriptor, while giving a greater delay to the encapsulated transport packets than the transport packets of the acquired input stream inserted along with the descriptor, and by adding a timestamp to each of the encapsulated transport packets and the transport packets of the acquired input stream, such that the generated partial transport stream includes the encapsulated transport packets and the transport packets of the acquired input stream;

a data block forming unit operable to convert the transport packets included in the generated partial transport stream into transmission packet payloads of a predetermined size;

a transmission packet header generation unit operable, when the detected data format information or the detected attribute information is control information relating to transmission, duplication, or reproduction of the content data, to generate a transmission packet header that contains size information indicating the predetermined size and contains the control information; and a transmission packet generation unit operable to generate transmission packets by combining the converted transmission packet payloads and the generated transmission packet header.

3. The packet transmitting apparatus according to claim 2, wherein the attribute information represents at least one of broadcasting system type, broadcasting network identification, broadcasting schedule/channel information, program title, program genre, channel number, program start time, program end time, and program description.

4. The packet transmitting apparatus according to claim 2, wherein, when the acquired input stream is a full transport stream, the predetermined size of the transmission packet payloads is designated by a length of time taken to receive the full transport stream, and wherein, when the acquired input stream is the partial transport stream, the predetermined size of the transmission packet payloads is designated by a time length or a byte length.

5. The packet transmitting apparatus according to claim 2, wherein said descriptor insertion unit is operable to generate a DTCP_descriptor or a DTCP_audio_descriptor using, as the control information, information from among at least one of broadcasting system type, broadcasting network identification, broadcasting schedule/channel information, and copy control information, which are contained in the acquired input stream, and operable to insert the generated DTCP_descriptor or the DTCP_audio_descriptor into a Program Map Table of the acquired input stream.

6. The packet transmitting apparatus according to claim 5, wherein said encapsulation unit is operable to encapsulate the data format information or MIME-Type into transport packets, regardless of a substance of copy control information for a unit-program of the acquired input stream.

7. The packet transmitting apparatus according to claim 2, wherein said packet transmitting apparatus accepts, from the outside, a data request that designates a target for data transmission by an HTTP protocol in units of any one of MPEG GOPs, pictures, slices, macro-blocks, blocks, TS packets, time-stamped TS packets, and a sector size, a cluster size, or a logical block size of a recording medium.

8. The packet transmitting apparatus according to claim 2, further comprising a transcoder that format-converts a representation format of the content data contained in the acquired input stream, between MPEG-2 and H.264, wherein the acquired input stream that has been format-converted by said transcoder is outputted as the partial transport stream.

9. The packet transmitting apparatus according to claim 2, further comprising an accumulation unit operable to accumulate the acquired input stream as a file.

10. The packet transmitting apparatus according to claim 9, comprising, for access to a content designated by an in-file position information management table at a time of reproduction:

a unit operable to inquire, from a content information service on the Internet, one of title data and image data that makes up one or more frame images contained in the content data, operable to acquire metadata or broadcasting date/time data relating to one or more scenes contained in the content data, and operable to create a content description table that links the acquired metadata or broadcasting date/time data to recording management information for the content data of the acquired input stream that is accumulated in said accumulation unit; and a unit operable to access each scene in the content data by referring to the content description table at the time of reproduction.

11. The packet transmitting apparatus according to claim 9, further comprising a unit operable to, when a high-definition content and metadata of the content data are accumulated in said accumulation unit, convert the high-definition content to a low-definition content, wherein a receiving side receives via a network the low-definition content converted from the high-definition content, creates a content selection/acquisition list from the low-definition content, and thereafter transmits the content selection/acquisition list to a sending side, and wherein the sending side includes a unit operable to transmit the high-definition content to the receiving side based on the content selection/acquisition list received from the receiving side.

12. The packet transmitting apparatus according to claim 9, wherein a control unit includes a unit operable to, when the file accumulated in said accumulation unit contains a content relating to music, access a tune information server on the Internet to acquire tune information for a music program, operable to create a tune position table that associates the acquired tune information in the file containing the content relating to music with a plurality of tunes in the file containing the content relating to music recorded in said accumulation unit by way of time range information of the music program, operable to record the tune position table in a directory for storing tune position tables in said accumulation unit, and operable to access each tune of the plurality of tunes in the file which has the tune position table at the time of reproduction.

13. The packet transmitting apparatus according to claim 12, comprising a unit operable to access the tune position table for each tune in a file of a title of the music program or <res> of UPnP when browsing or search is performed on each tune of the music program through a content directory service of UPnP-A/V.

14. The packet transmitting apparatus according to claim 12, wherein, for access to each tune in a file that has the tune position table at the time of reproduction, a receiving apparatus designates and transmits a tune title, as a CGI parameter, to a transmitting apparatus, and the transmitting apparatus includes a unit operable to access each tune from the file using the CGI parameter.

15. The packet transmitting apparatus according to claim 2, comprising:
  an H.264 encoder that encodes each of a left-eye image and a right-eye image into an H.264 signal; and
  a unit operable to convert an output from said H.264 encoder into transport stream packets,
  wherein during the encoding by said H.264 encoder, a 2-channel image is synchronized by being encoded, such that frames that are temporally closest to each other form an H.264 IDR picture, and
  wherein said packet transmitting apparatus comprises a unit operable to input packets of two transport streams into two of said packet transmitting apparatuses according to claim 1, respectively.

16. The packet transmitting apparatus according to claim 15, comprising a unit operable to, when encoding each of the left-eye image and the right-eye image into the H.264 signal, encode one of the left-eye image and the right-eye image only into B pictures or P pictures, by referring to the other of the left-eye image and the right-eye image.

17. A packet transmitting method, comprising:
  a reception step of receiving a plurality of broadcasting channels, each of the plurality of broadcasting channels having specific program information, and acquiring an input stream of a specific broadcasting channel of the plurality of received broadcasting channels;
  a program information acquisition step of extracting first program information from the acquired input stream, and acquiring second program information relating to a program on the specific broadcasting channel, the second program information being acquired from at least one of (i) a reception signal of a preset broadcasting channel that is different from the specific broadcasting channel, and (ii) an input signal received via a communication network;
  a program information recomposition step of recomposing new program information that includes attribute information, the new program information being recomposed by selecting one of the first program information and the second program information, or by combining both the first program information and the second program information, the attribute information indicating whether the new program information is recomposed by selecting the first program information, selecting the second program information, or by combining the first program information and the second program information;
  a filtering step of performing filtering on the acquired input stream using the recomposed new program information; and
  a transmission step of forming a new output stream that contains the filtered input stream, packetizing the formed new output stream, and transmitting the packetized output stream to the outside.

18. A non-transitory computer-readable recording medium having a computer-executable program recorded thereon, the computer-executable program for performing packet transmission, said computer-executable program causing a computer to execute a method comprising:
  a reception step of receiving a plurality of broadcasting channels, each of the plurality of broadcasting channels having specific program information, and acquiring an input stream of a specific broadcasting channel of the plurality of received broadcasting channels;
  a program information acquisition step of extracting first program information from the acquired input stream, and acquiring second program information relating to a program on the specific broadcasting channel, the second program information being acquired from at least one of (i) a reception signal of a preset broadcasting channel that is different from the specific broadcasting channel, and (ii) an input signal received via a communication network;
  a program information recomposition step of recomposing new program information that includes attribute information, the new program information being recomposed by selecting one of the first program information and the second program information, or by combining both the first program information and the second program information, the attribute information indicating whether the new program information is recomposed by selecting the first program information, selecting the second program information, or by combining the first program information and the second program information;
  a filtering step of performing filtering on the acquired input stream using the recomposed new program information; and
  a transmission step of forming a new output stream that contains the filtered input stream, packetizing the formed new output stream, and transmitting the packetized output stream to the outside.

* * * * *